(12) United States Patent
Ito

(10) Patent No.: US 8,129,960 B2
(45) Date of Patent: Mar. 6, 2012

(54) RESONANCE TYPE ELECTRIC POWER CONVERSION APPARATUS AND METHOD

(75) Inventor: Yoshihiro Ito, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 449 days.

(21) Appl. No.: 12/118,486

(22) Filed: May 9, 2008

(65) Prior Publication Data

US 2008/0278130 A1 Nov. 13, 2008

(30) Foreign Application Priority Data

May 11, 2007 (JP) .................. 2007-126770

(51) Int. Cl.
*G05F 1/613* (2006.01)
*G05F 3/16* (2006.01)

(52) U.S. Cl. ..................... 323/225; 363/56.12

(58) Field of Classification Search ............ 323/235, 323/319, 222, 225, 229, 223, 230; 363/56.12, 363/21.03, 21.02
See application file for complete search history.

(56) References Cited

U.S. PATENT DOCUMENTS

| | | | | |
|---|---|---|---|---|
| 5,991,174 A | * | 11/1999 | Farrington et al. | ........ 363/56.11 |
| 2003/0063480 A1 | * | 4/2003 | Morita et al. | .................. 363/37 |
| 2004/0227496 A1 | * | 11/2004 | Hosotani et al. | ............. 323/282 |

FOREIGN PATENT DOCUMENTS

| FR | 2 884368 A | 10/2006 |
|---|---|---|
| JP | 2001-309646 A | 11/2001 |

OTHER PUBLICATIONS

Yukinori Tsuruta et al., "A New Circuit Geometry SAZZ for an EV Drive Application", The 2006 IEEE Industry Applications Conference Forty-First IAS Annual Meeting, Conference Record of IEEE, PI, Oct. 1, 2006, pp. 2144-2149, XP031026318; ISBN: 978-1-4244-0364-6.

(Continued)

*Primary Examiner* — Harry Behm
*Assistant Examiner* — Matthew Grubb
(74) *Attorney, Agent, or Firm* — Arent Fox LLP

(57) ABSTRACT

A resonance type electric power conversion apparatus which includes a main circuit including a main reactor, a main switching device, an inverse-parallel diode and an output power diode, and an auxiliary circuit including an auxiliary reactor, an auxiliary switch, and an auxiliary capacitor connected in parallel to the main switching device for forming a recovery current elimination circuit and a partial resonance circuit for discharging charge accumulated in the auxiliary capacitor to turn on the inverse-parallel diode, includes recovery current elimination period calculation means for calculating a recovery current elimination period after the present point of time until the current flowing through the output power diode becomes zero and the charge of the output power diode disappears based on a voltage value across the auxiliary reactor, a current value of the main reactor and an inductance value of the auxiliary reactor, and control means for controlling the auxiliary switching device to turn on based on the recovery current elimination period.

4 Claims, 23 Drawing Sheets

OTHER PUBLICATIONS

Tsuruta Y et al., "A New Zero-Voltage-Zero-Current-Transition Chopper SAZZ for a FCEV Drive", Industrial Electronics Society, 2005. IECON 2005. 31st Annual Conference of IEEE, IEEE, Piscataway, NJ, USA, Nov. 6, 2005, pp. 573-578, XP010875938; ISBN: 978-0-7803-9252-6.

Vilela, M.S., et al., "A Family of PWM Soft-Switching Converters with Low Stresses of Voltage and Current", Applied Power Electronics Conference and Exposition 1996. APEC '96. Conference Proceedings 1996, Eleventh Annual San Jose, CA., USA Mar. 3-7, 1996, New York, NY, USA, IEEE, US, vol. 1, Mar. 3, 1996, pp. 299-304; XP010159768; ISBN: 978-0-7803-3.044-3.

Tsuruta Y, et al., "QRAS and SAZZ Chopper for HEV Drive Application", Yokohama Nat. Univ., Yokohama; Power Conversion Conference, Nagoya 2007, PCC '07; Apr. 2-5, 2007; pp. 1260-1267; ISBN:1-4244-0844-X.

* cited by examiner

FIG. 2
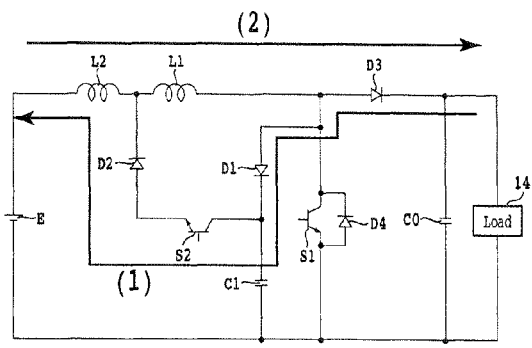
MODE1
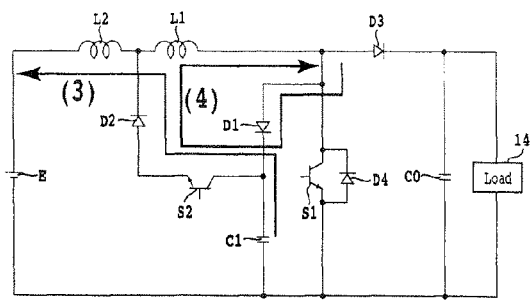
MODE2
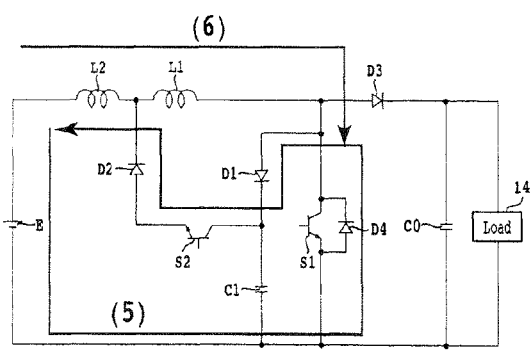
MODE3
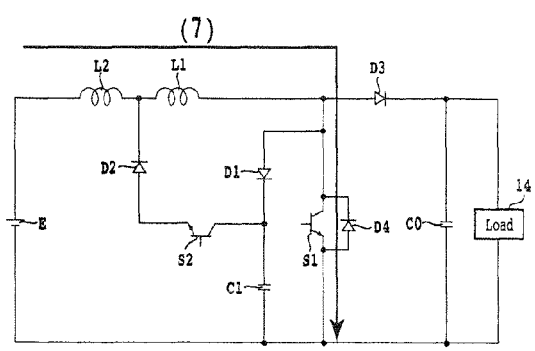
MODE4
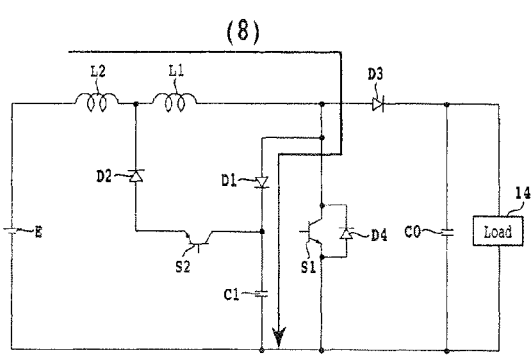
MODE5
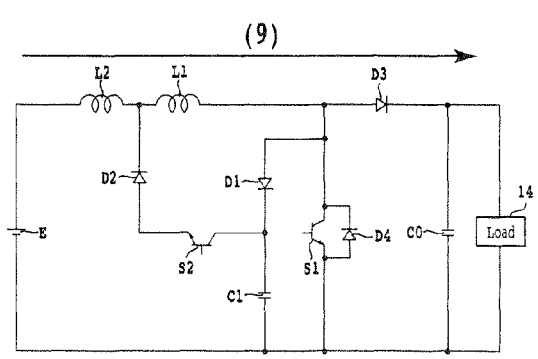
MODE6

FIG. 8
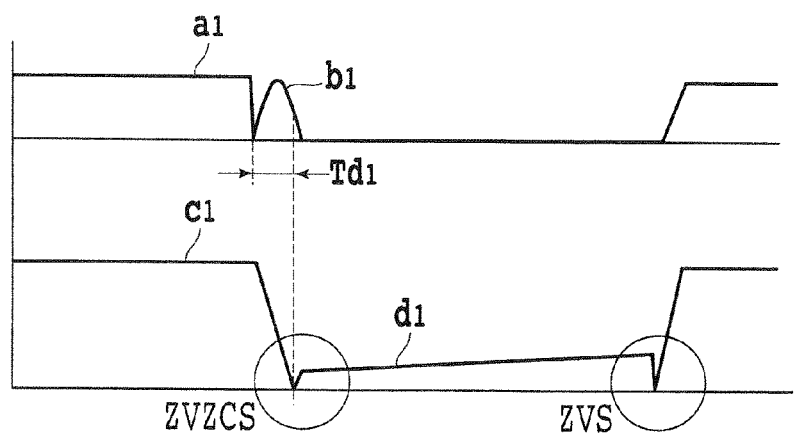
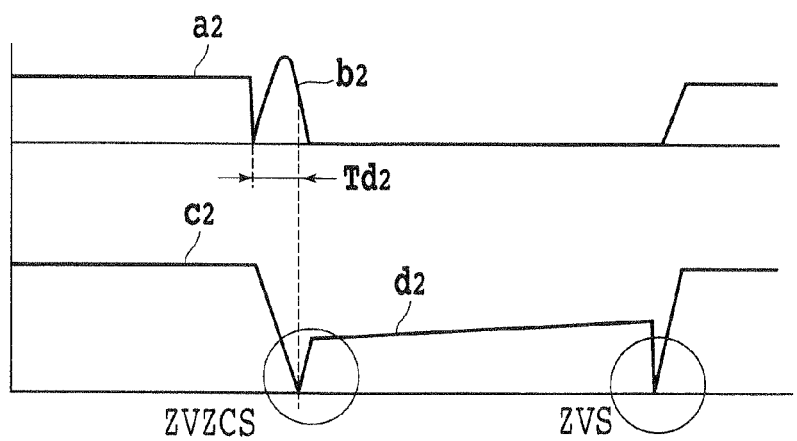
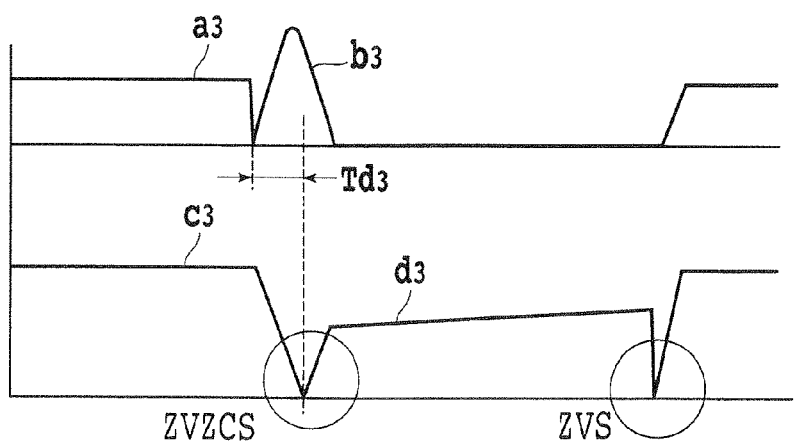

FIG.15
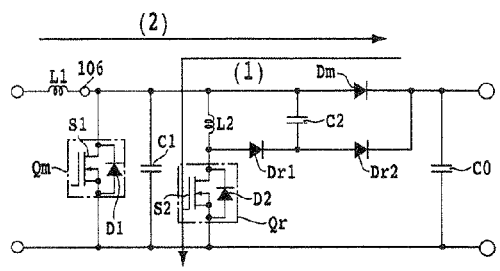
MODE1
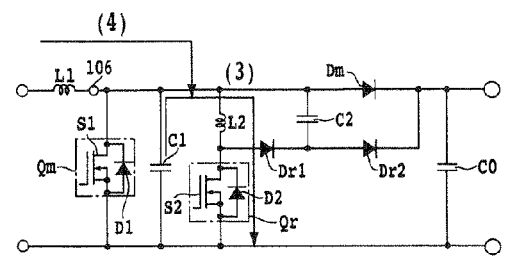
MODE2
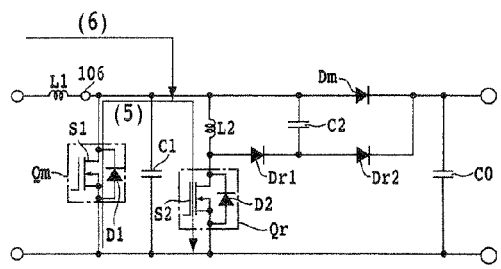
MODE3
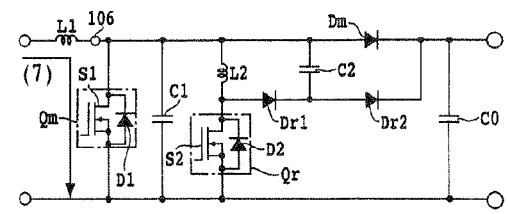
MODE4
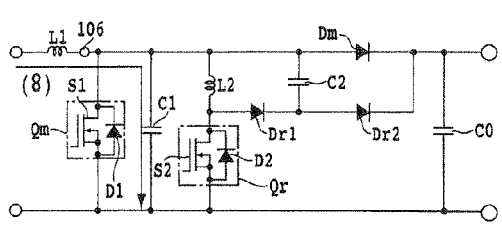
MODE5
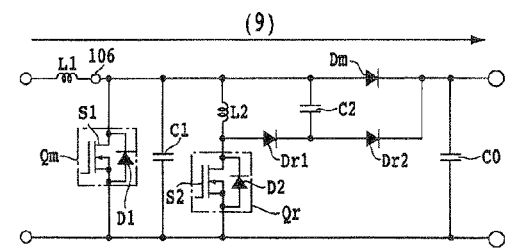
MODE6

FIG.19
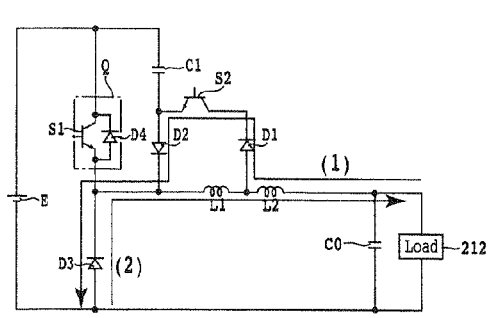
MODE1
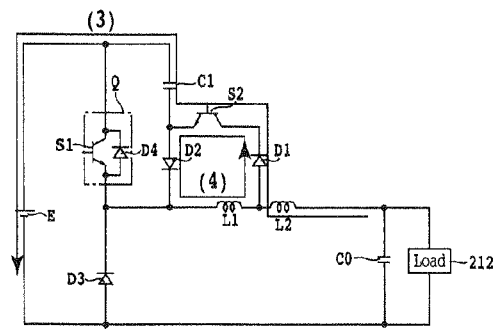
MODE2
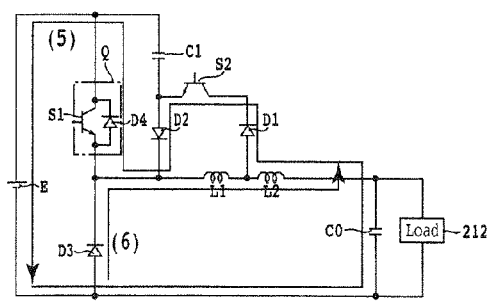
MODE3
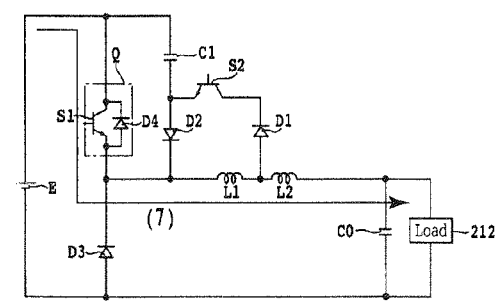
MODE4
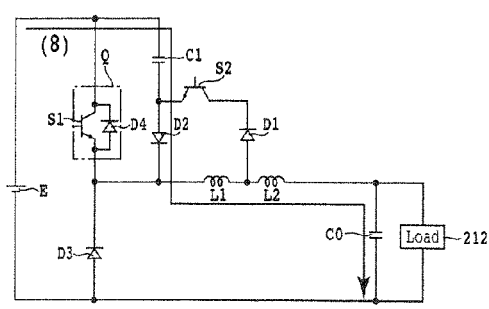
MODE5
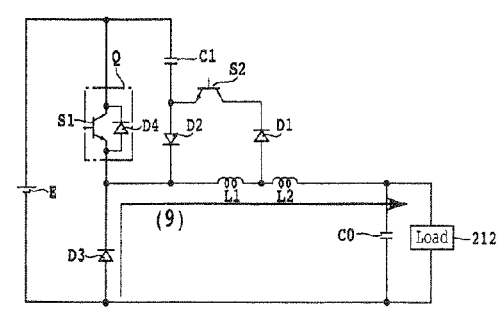
MODE6

RESONANCE TYPE ELECTRIC POWER CONVERSION APPARATUS AND METHOD

BACKGROUND OF THE INVENTION

1. Field of the Invention

This invention relates to a resonance type electric power conversion apparatus and method, and more particularly to a soft switch upon elimination of recovery current and upon turning on of a main switching device of a resonance type electric power conversion apparatus of a voltage step-up circuit, a voltage step-down circuit and so forth.

2. Description of the Related Art

In a hybrid automobile, a fuel cell vehicle, an electrically driven vehicle and like vehicles, driving force is generated by a motor generator and transmitted to an axle. In order to obtain driving force optimum to a driving condition of the vehicle, a power supply voltage of a direct current (dc) power supply is boosted to a desired voltage by a voltage step-up circuit, and the driving force of the motor generator is obtained based on the boosted voltage. Further, a voltage generated by the motor generator is stepped down to a desired voltage by a voltage step-down circuit, and dc power is regenerated based on the stepped down voltage.

In order to implement high output power and a high efficiency, it is necessary to reduce the switching loss as far as possible and use a higher frequency to reduce the scale as far as possible. To this end, a technique is required for eliminating recovery current of an output power diode or a return diode upon soft switching such as voltage-zero current switching (ZVCS) or zero-voltage switching (ZVS) upon switching on/off of a switching device and upon switching on of a main switching device. The recovery current here signifies current flowing through the main switching device and originating from charge accumulated in the output power diode or the like when the main switching device is turned on to reversely bias the output power diode or the like.

As a resonance type electric power conversion apparatus, a SAZZ (Snubber Assisted Zero voltage and Zero current transition) voltage step-up circuit, a ZVT (Zero Volt Transition) voltage step-up circuit and so forth have been proposed. Such electric power conversion apparatus include a main circuit including a main reactor, a main switching device, an inverse-parallel diode connected in inverse-parallel to the switching device and an output power diode, and an auxiliary circuit including an auxiliary reactor, an auxiliary switch and an auxiliary capacitor for forming a recovery current elimination circuit for discharging charge accumulated in the output power diode and a partial resonance circuit for discharging charge accumulated in the auxiliary capacitor.

The auxiliary switching device is turned on to output charge accumulated in the output power diode through the recovery current elimination circuit (MODE 1). Charge accumulated in the auxiliary capacitor is discharged through the partial resonance circuit (MODE 2). When the auxiliary capacitor completes the charging and the charge disappears from the auxiliary capacitor, back electromotive force is generated in the auxiliary reactor and the inverse-parallel diode is turned on, and consequently, current flows through the inverse-parallel diode. At this point of time, the main switching device is turned on (MODE 3). When the main switching device is turned on, current flows from the power supply to the main switching device through the main reactor and magnetic energy is accumulated in the main reactor (MODE 4). The main switching device is turned off to charge the auxiliary capacitor (MODE 5). When the voltage of the auxiliary capacitor becomes equal to the output voltage, the output power diode is turned on, and power is supplied to the load side through the output power diode (MODE 6).

Conventionally, the time after the auxiliary switching device is turned on until the main switching device is turned on is set to a fixed period of time irrespective of the output power of the voltage step-up circuit and so forth. Also in the resonance type electric power conversion apparatus as a voltage step-down circuit, the time after the auxiliary switching device is turned on until the main switching device is turned on is set to a fixed period of time irrespective of the output power of the voltage step-down circuit and so forth similarly.

Japanese Patent Laid-open No. 2001-309646 is available as a conventional art document relating to soft switching of the voltage step-up circuit described above.

However, conventional voltage step-up circuits have the following problem in control thereof. As described above, the delay time after an auxiliary switching device of a voltage step-up circuit or the like is turned on until a main switching device is turned on is set to a fixed period of time as described above. However, in the MODE 1, the time (recovery current eliminating time) for eliminating charge accumulated in the output power diode using the recovery current elimination circuit is a variable period of time which depends upon the output voltage, input voltage, current (output current) flowing to the main reactor and so forth. Since the output voltage, output current and so forth are fluctuated by a load to a motor generator to which the voltage step-up circuit or the like is connected and the like, the recovery current elimination period fluctuates as time passes. Conventionally, since the delay time after the auxiliary switching device is turned on until the main switching device is turned on is set to a fixed period of time, the delay time is not an optimum period of time.

Therefore, where the delay time is longer than optimum time, current flows excessively as much to the auxiliary switching device. Consequently, there is a problem that the efficiency is deteriorated by resistance loss in the auxiliary switching device. Further, although the inverse-parallel diode is turned on and current flows at a point of time when the charge accumulated in the auxiliary capacitor disappears, a different circuit loop is produced, which blocks soft switching of the main switching device, resulting in a problem that the switching loss increases. This gives rise to a problem that the efficiency of the electric power conversion apparatus is deteriorated.

On the other hand, where the delay time is shorter than the optimum time, the discharging of the auxiliary capacitor does not come to an end. Consequently, the charge remains, and the inverse-parallel diode is not turned on and the MODE 3 is not entered. Therefore, the main switching device switches not by soft switching but by hard switching, resulting in a problem that the switching loss is high. This gives rise to a problem that the efficiency of the electric power conversion apparatus is deteriorated.

Meanwhile, in the conventional technique of Japanese Patent Laid-open No. 2001-309646, the main switching device 110 is controlled so as to turn on in response to detection that the voltage across the auxiliary capacitor 141 decreases to zero. However, the operation condition of the voltage step-up circuit varies in response to variation of the load 150, and for example, in a low load region, charge remains in the auxiliary capacitor 141 and the voltage across the auxiliary capacitor 141 does not reduce to zero. Therefore, the conventional technique described has a problem that the control of the voltage step-up circuit is disabled in the low load region.

SUMMARY OF THE INVENTION

It is an object of the present invention to provide a resonance type electric power conversion apparatus wherein a recovery current elimination period is calculated and an auxiliary switching device is turned on based on the recovery current elimination period to enable soft switching of a main switching device.

According to a first aspect of the present invention, there is provided a resonance type electric power conversion apparatus including a main circuit including a main reactor connected at a first terminal thereof to the positive electrode side of a dc power supply and at a second terminal thereof to the load side, a main switching device interposed between a second terminal of the main reactor and the negative electrode of the do power supply, an inverse-parallel diode connected in inverse-parallel to the main switching device, and an output power diode interposed between the second terminal of the main reactor and the load, an auxiliary circuit including an auxiliary reactor, an auxiliary switch, and an auxiliary capacitor connected in parallel to the main switching device, the auxiliary circuit being provided for forming a recovery current elimination circuit for discharging charge accumulated in the output power diode in a direction reverse to that of current which flows from the main reactor to the auxiliary reactor and a partial resonance circuit for discharging charge accumulated in the auxiliary capacitor to turn on the inverse-parallel diode, recovery current elimination period calculation means for calculating a recovery current elimination period after the present point of time until the current flowing through the output power diode becomes zero and the charge of the output power diode disappears based on a voltage value across the auxiliary reactor, a current value of the main reactor and an inductance value of the auxiliary reactor, and control means for calculating delay time until the accumulated charge in the auxiliary capacitor is minimized based on the recovery current elimination period and controlling the auxiliary switching device to turn on prior by the delay time to the main switching device.

According to a second aspect of the present invention, there is provided a resonance type electric power conversion apparatus including a main circuit including a main reactor connected at a first terminal thereof to the positive electrode side of a dc power supply and at a second terminal thereof to the load side, a main switching device interposed between the do power supply and the main reactor, an inverse-parallel diode connected in inverse-parallel to the main switching device, and a return diode interposed between the second terminal of the main reactor and the negative terminal of the dc power supply, an auxiliary circuit including an auxiliary reactor, an auxiliary switch, and an auxiliary capacitor connected in parallel to the main switching device, the auxiliary circuit being provided for forming a recovery current elimination circuit for discharging charge accumulated in the return diode in a direction reverse to that of current which flows from the main reactor to the auxiliary reactor and a partial resonance circuit for discharging charge accumulated in the auxiliary capacitor to turn on the inverse-parallel diode, recovery current elimination period calculation means for calculating a recovery current elimination period after the present point of time until the current flowing through the return diode becomes zero and the charge of the return diode disappears based on a voltage value across the auxiliary reactor, a current value of the main reactor and an inductance value of the auxiliary reactor, and control means for calculating delay time until the accumulated charge in the auxiliary capacitor is minimized based on the recovery current elimination period and controlling the auxiliary switching device to turn on prior by the delay time to the main switching device.

According to a third aspect of the present invention, there is provided a control method for a resonance type electric power conversion apparatus which includes a main circuit including a main reactor connected at a first terminal thereof to the positive electrode side of a do power supply and at a second terminal thereof to the load side, a main switching device interposed between a second terminal of the main reactor and the negative electrode of the dc power supply, an inverse-parallel diode connected in inverse-parallel to the main switching device, and an output power diode interposed between the second terminal of the main reactor and the load, and an auxiliary circuit including an auxiliary reactor, an auxiliary switch, and an auxiliary capacitor connected in parallel to the main switching device for charging the auxiliary capacitor when the main switching device turns off, the auxiliary circuit being provided for forming a recovery current elimination circuit for discharging charge accumulated in the output power diode in a direction reverse to that of current which flows from the main reactor to the auxiliary reactor and a partial resonance circuit for discharging charge accumulated in the auxiliary capacitor to turn on the inverse-parallel diode, including a step of detecting a voltage value applied to the auxiliary reactor, a step of detecting a current value of the main reactor, a step of calculating a recovery current elimination period after the present point of time until the current flowing through the output power diode becomes zero and the charge of the output power diode disappears based on a voltage value across the auxiliary reactor, a current value of the main reactor and an inductance value of the auxiliary reactor, and a step of controlling the auxiliary switching device to turn on prior to the main switching device by delay time based on discharge time until the accumulated charge in the auxiliary capacitor of the partial resonance circuit is minimized by discharge, the discharge time being based on the recovery current elimination time, the capacitance of the auxiliary capacitor and the inductance of the auxiliary reactor.

According to a fourth aspect of the present invention, there is provided a control method for a resonance type electric power conversion apparatus which includes a main circuit including a main reactor connected at a first terminal thereof to the positive electrode side of a do power supply and at a second terminal thereof to the load side, a main switching device interposed between the do power supply and the main reactor, an inverse-parallel diode connected in inverse-parallel to the main switching device, and a return diode interposed between the second terminal of the main reactor and the negative terminal of the do power supply, and an auxiliary circuit including an auxiliary reactor, an auxiliary switch, and an auxiliary capacitor connected in parallel to the main switching device, the auxiliary circuit being provided for forming a recovery current elimination circuit for discharging charge accumulated in the return diode in a direction reverse to that of current which flows from the main reactor to the auxiliary reactor and a partial resonance circuit for discharging charge accumulated in the auxiliary capacitor to turn on the inverse-parallel diode, comprising a step of detecting a voltage value applied to the auxiliary reactor, a step of detecting a current value of the main reactor, a step of calculating a recovery current elimination period after the present point of time until the current flowing through the return diode becomes zero and the charge of the return diode disappears based on a voltage value applied to the auxiliary reactor, a current value of the main reactor and an inductance value of the auxiliary reactor, and a step of controlling the auxiliary switching device to turn on prior to the main switching device by delay time based on discharge time until the accumulated charge in the auxiliary capacitor of the partial resonance circuit is minimized by discharge, the discharge time being based on the recovery current elimination time, the capacitance of the auxiliary capacitor and the inductance of the auxiliary reactor.

The above and other objects, features and advantages of the present invention and the manner of realizing them will become more apparent, and the invention itself will best be understood, from a study of the following description and the appended claims with reference to the attached drawings showing some preferred embodiments of the invention.

BRIEF DESCRIPTION OF THE DRAWINGS

FIG. 2 is a view illustrating operation of the SAZZ voltage step-up circuit;

FIGS. 7 and 8 are time charts illustrating operation of the first embodiment of the present invention;

FIG. 15 is a view illustrating operation of the ZVT voltage step-up circuit;

FIG. 19 is a view illustrating operation of the SAZZ voltage step-down circuit;

DETAILED DESCRIPTION OF THE PREFERRED EMBODIMENTS

First Embodiment

Figure 1:
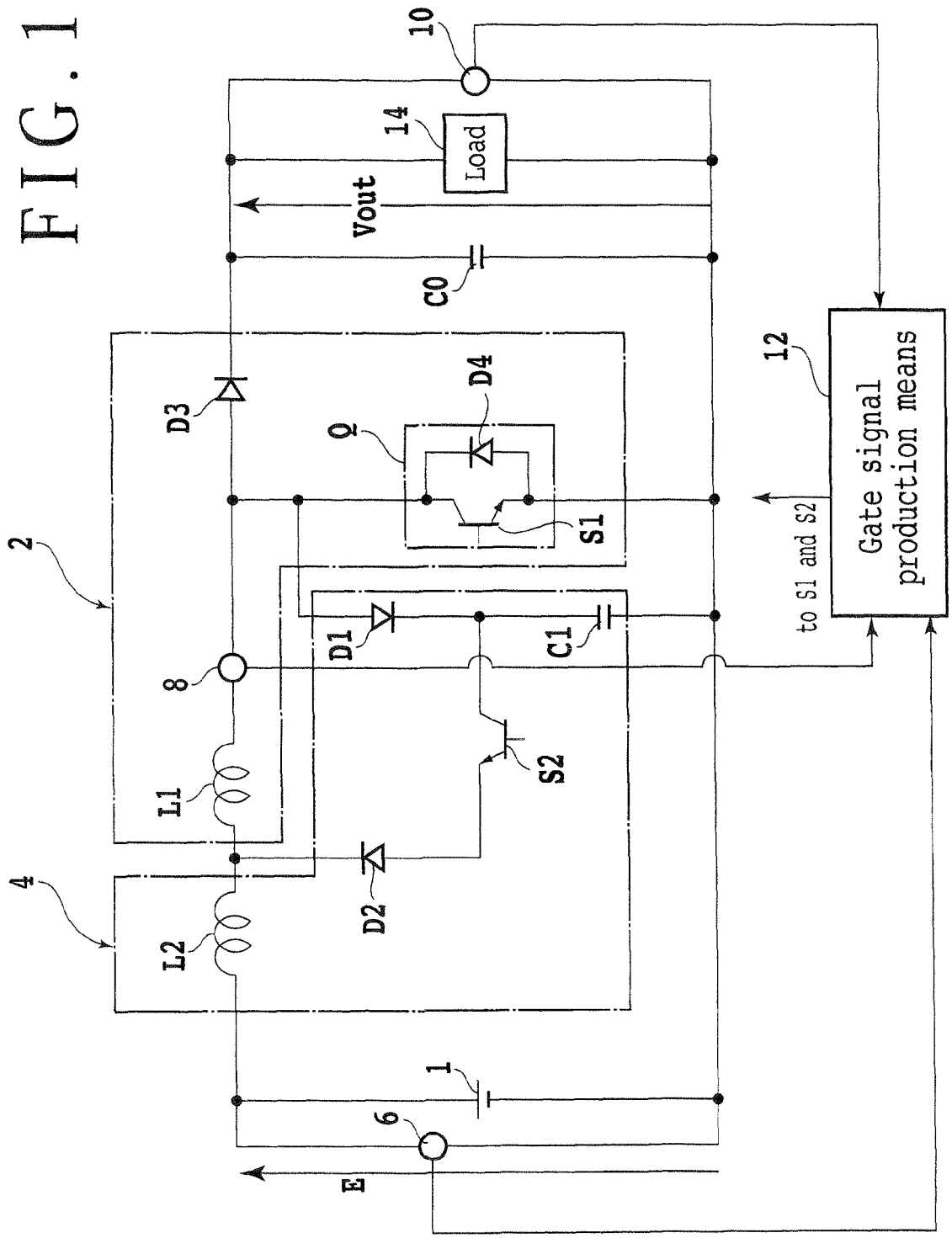
FIG. 1 is a circuit diagram showing a SAZZ voltage step-up circuit according to a first embodiment of the present invention.

FIG. 1 is a circuit diagram of a SAZZ voltage step-up circuit as a resonance type electric power conversion apparatus according to a first embodiment of the present invention. Referring to FIG. 1, the SAZZ voltage step-up circuit includes a dc power supply 1, a main circuit 2, an auxiliary circuit 4, an input voltage sensor 6, a main reactor current sensor 8, an output voltage sensor 10, gate signal production means 12 and a load 14.

The do power supply 1 is a battery apparatus for supplying power to the load 14 through the main circuit 2 and includes a lithium ion cell, a nickel-hydrogen cell or the like. The do power supply 1 includes a plurality of battery blocks connected in series and each formed from a module of a plurality of electric cells. The dc power supply 1 can be a capacitor.

The main circuit 2 includes a main reactor L1, a main switch Q (SWQ) and an output power diode D3, and boost a voltage to a desired voltage value through the do power supply 1 and the main reactor L1 based on on/off operations of a main switching device S1 in the main SWQ. The main reactor L1 is connected at a first terminal thereof to the positive electrode side of the do power supply 1 through a second terminal of an auxiliary reactor L2 and at a second terminal thereof to the anode of the output power diode D3.

The main SWQ includes the main switching device S1 and a diode D4 connected in inverse-parallel to each other. The main switching device S1 is, for example, an Inslated Gate Bipolar Transistor (IGBT) device and is connected at the collector thereof to the second terminal of the main reactor L1 and at the emitter thereof to the negative electrode of the do power supply 1. A gate signal for turning the main switching device S1 on/off is inputted to the gate of the main switching device S1 from the gate signal production means 12. The diode D4 is connected at the anode thereof to the emitter of the main switching device S1 and at the cathode thereof to the collector of the main switching device S1. The output power diode D3 is connected at the anode thereof to the second terminal of the main reactor L1 and at the cathode thereof to first terminal of the load 14 and a capacitor C0.

The auxiliary circuit 4 includes the auxiliary reactor L2, first and second auxiliary diodes D1 and D2, an auxiliary switching device S2 and an auxiliary capacitor (also called snubber capacitor) C1. The auxiliary circuit 4 forms a recovery current elimination circuit for discharging charge accumulated in the output power diode D3 to eliminate recovery current and a partial resonance circuit for discharging charge accumulated in the auxiliary capacitor C1.

The auxiliary reactor L2 is connected at a first terminal thereof to the positive electrode of the do power supply 1 and at the second terminal thereof to first terminal of the main reactor L1. The first auxiliary diode D1 is connected at the anode thereof to the second terminal of the main reactor L1 through the main reactor current sensor 8 and to the anode of the output power diode D3 and at the cathode thereof to the collector of the auxiliary switching device S2 and a first terminal of the auxiliary capacitor C1. The auxiliary switching device S2 is, for example, an IGBT device and receives, at the gate thereof, a gate signal for turning the auxiliary switching device S2 on/off from the gate signal production means 12. The auxiliary switching device S2 is connected at the cathode thereof to the cathode of the first auxiliary diode D1 and the first terminal of the auxiliary capacitor C1 and at the emitter thereof to the anode of the second auxiliary diode D2.

The second auxiliary diode D2 is connected at the anode thereof to the emitter of the second auxiliary switching device D2 and at the cathode thereof to the first terminal of the main reactor L1 and the second terminal of the auxiliary reactor L2. The auxiliary capacitor C1 is connected at the first terminal thereof to the cathode of the first auxiliary diode D1 and at a second terminal thereof to the negative electrode of the dc power supply 1.

The first auxiliary diode D1, auxiliary switching device S2, second auxiliary diode D2 and auxiliary reactor L2 form a recovery current elimination circuit for discharging charge accumulated in the output power diode D3 along a route of the capacitor C0→output power diode D3→first auxiliary diode D1→auxiliary switching device S2→second auxiliary diode D2→auxiliary reactor L2→do power supply 1.

The auxiliary capacitor C1, auxiliary switching device S2, second auxiliary diode D2 and auxiliary reactor L2 form a partial resonance circuit for discharging charge accumulated in the auxiliary capacitor C1 along a route of the auxiliary capacitor C1→auxiliary switching device S2→second auxiliary diode D2→auxiliary reactor L2→do power supply 1→auxiliary capacitor C1.

The input voltage sensor 6 detects an input voltage E of the do power supply 1 and outputs an electric signal corresponding to the input voltage E to the gate signal production means 12. The main reactor current sensor 8 is connected to the upstream side in regard to current in the forward direction with respect to a branching point of the second terminal of the main reactor L1 to the anode of the first auxiliary diode D1 or on the downstream side in regard to current in the forward direction with respect to a joining point of the first terminal of the main reactor L1 to the anode of the second auxiliary diode D2, and detects main reactor current iL1 flowing through the main reactor L1 and outputs an electric signal corresponding to the current iL1 to the gate signal production means 12. The output voltage sensor 10 detects an output voltage Vout across the load 14 and outputs an electric signal corresponding to the output voltage Vout to the gate signal production means 12.

The capacitor C0 is a smoothing capacitor and is connected to the cathode of the output power diode D3 and the negative electrode of the do power supply 1. The load 14 is, for example, a motor connected through a three-phase inverter apparatus and is connected to the cathode of the output power diode D3 and the negative electrode side of the do power supply 1.

In the following, operation of the SAZZ voltage step-up circuit is described. In the SAZZ voltage step-up circuit, a MODE 1 to a MODE 6 described below are repeated. FIG. 2 illustrates the MODE 1 to the MODE 6.

The MODE 1 is a state wherein only the auxiliary switching device S2 is on in a state wherein the auxiliary capacitor C1 is charged up for eliminating the accumulated charge in the output power diode D3. If the auxiliary switching device S2 is turned on, then current flows from the output side to the input side as indicated by (1). In particular, current for eliminating the accumulated charge of the output power diode D3 flows along the output power diode D3→first auxiliary diode D1→auxiliary switching device S2→second auxiliary diode D2→auxiliary reactor L2→dc power supply 1. Here, the current indicated by (1) gradually increases from zero, and the auxiliary switching device S2 turns on by ZCS (zero current switching).

On the other hand, as indicated by (2), current in the forward direction flows along the do power supply 1→auxiliary reactor L2→main reactor L1→output power diode D3→load 14. In the MODE 1, the main switching device S1 remains in an off state. The auxiliary switching device S2 is controlled so as to be turned on prior by variable delay time Td(t) to time at which the main switching device S1 is to be turned on so that the main switching device S1 is turned on at a timing at which the MODE 3 is started as hereinafter described. If the current flowing from the output side to the input side for eliminating the recovery current indicated by (1) and the current flowing from the input side to the output side indicated by (2) become equal to each other, then the current of the output power diode D3 becomes zero and the charge accumulated in the output power diode D3 disappears.

The MODE 2 is a state of a resonance mode based on a turning on state of the auxiliary switching device S2 wherein the current flowing through the main reactor L1 and the current flowing through the auxiliary switching device S2 are equal to each other and the current flowing through the output power diode D3 is zero. In this state, since the current flowing through the output power diode D3 is zero, return current flows in a loop of the main reactor L1→first auxiliary diode D1→auxiliary switching device S2→second auxiliary diode D2→main reactor L1.

Consequently, the bias from the output power diode D3 to the second terminal of the auxiliary reactor L2 is canceled, and an inductance-capacitance (LC) partial resonance circuit is formed from the auxiliary capacitor C1→auxiliary switching device S2→second auxiliary diode D2→dc power supply 1 as seen in (3) and discharging of the auxiliary capacitor C1 is started. Consequently, the current flowing through the auxiliary reactor L2 LC resonates. Thereafter, the energy of the auxiliary capacitor C1 moves into the auxiliary reactor L2. Then, the discharging of the auxiliary capacitor C1 comes to an end, and the charge in the auxiliary capacitor C1 disappears or is minimized and the voltage across the auxiliary capacitor C1 becomes zero or is minimized.

The MODE 3 is a state wherein the voltage of the auxiliary capacitor C1 is zero and turning on of the main switching device S1 causes ZVZCT (zero-voltage and zero-current transition) operation. In this state, back electromotive force is generated in the auxiliary reactor L2 and the diode D4 turns on, and consequently, energy stored in the auxiliary reactor L2 begins to flow as inverse current along a route of the diode D4 first auxiliary diode D1→auxiliary switching device S2→second auxiliary diode D2→auxiliary reactor L2→dc power supply 1→diode D4 as seen in (5). At this time, the main switching device S1 turns on. Consequently, since the diode D4 exhibits an on state and inverse current flows through the diode D4, the current to flow through the main switching device S1 is suppressed, and ZCS (zero current switching) occurs. In short, the main switching device S1 turns on by ZVZCT operation. Meanwhile, as seen from (6), the current flowing along the auxiliary reactor L2→main reactor L1 joins with the current indicated by (5).

The MODE 4 is a state in which the main switching device S1 is on. In this state, current flows along a route of the dc power supply 1→auxiliary reactor L2→main reactor L1→main switching device S1 as seen in (7), and energy is accumulated into the main reactor L1.

The MODE 5 is a state wherein the main switching device S1 and the auxiliary switching device S2 are off. In this state, since discharging of the auxiliary capacitor C1 ends already, no current flows through the auxiliary switching device S2. Therefore, the auxiliary switching device S2 turns off by ZCS operation. Further, as seen from (8), current flows along a route of the auxiliary reactor L2→main reactor L1→first auxiliary diode D1→auxiliary capacitor C1 and charges the auxiliary capacitor C1. Since the auxiliary capacitor C1 is charged, turning off of the main switching device S1 is carried out as ZVT operation.

The MODE 6 is a state wherein the main switching device S1 is off. When the auxiliary capacitor C1 is charged until the voltage thereof becomes equal to the voltage on the output side, the output power diode D3 turns on and current flows along a route of the auxiliary reactor L2→main reactor L1→output power diode D3 as indicated by (9). Then, energy stored in the main reactor L1 flows out to the load 14 side.

The MODE 1 to the MODE 6 described above are repeated.

The gate signal production means 12 produces gate signals for turning on/off the main switching device S1 and the auxiliary switching device S2. In particular, the gate signal production means 12 outputs gate signals to the main switching device S1 and the auxiliary switching device S2 such that the auxiliary switching device S2 is turned on prior by the variable delay time Td(t) to turning on of the main switching device S1 as hereinafter described and the main switching device S1 exhibits an on state for a period of time equal to the pulse width defined by the duty ratio according to the input voltage E and the output voltage Vout.

Figure 3:
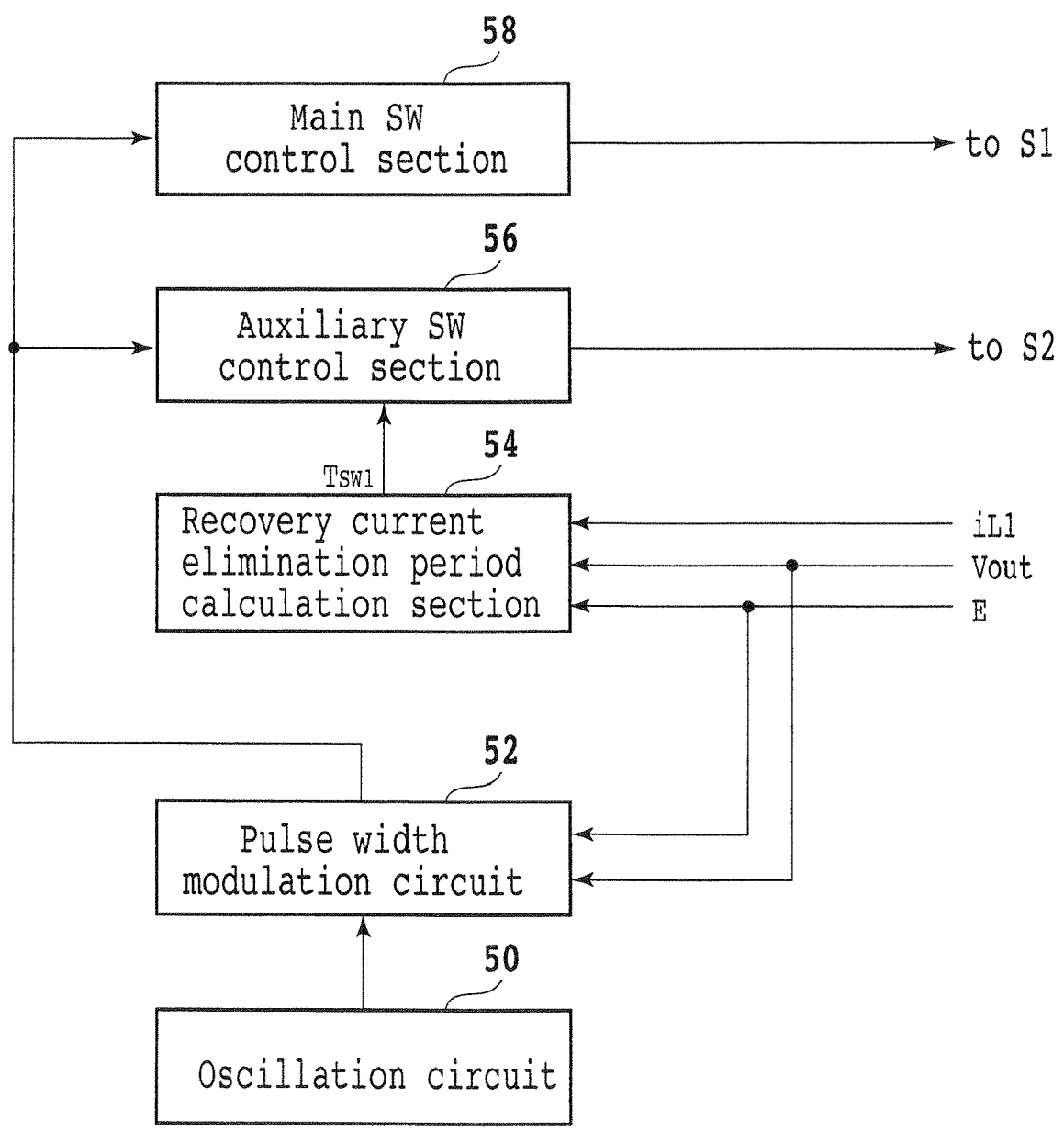
FIG. 3 is a functional block diagram of gate signal production means shown in FIG. 1.

Referring to FIG. 3, the gate signal production means 12 includes an oscillation circuit 50, a pulse width modulation circuit 52, a recovery current elimination period calculation section 54, an auxiliary SW control section 56 and a main SW control section 58. The oscillation circuit 50 outputs an oscillation signal of a fixed frequency. The pulse width modulation circuit 52 produces a pulse width modulation signal having a pulse width of a duty ratio corresponding to step-up ratio from the oscillation signal based on the output voltage Vout and the input voltage E. The recovery current elimination period calculation section 54 calculates a recovery current elimination period which is a period of time until charge accumulated in the output power diode D3 is discharged through the recovery current elimination circuit.

Figure 4:
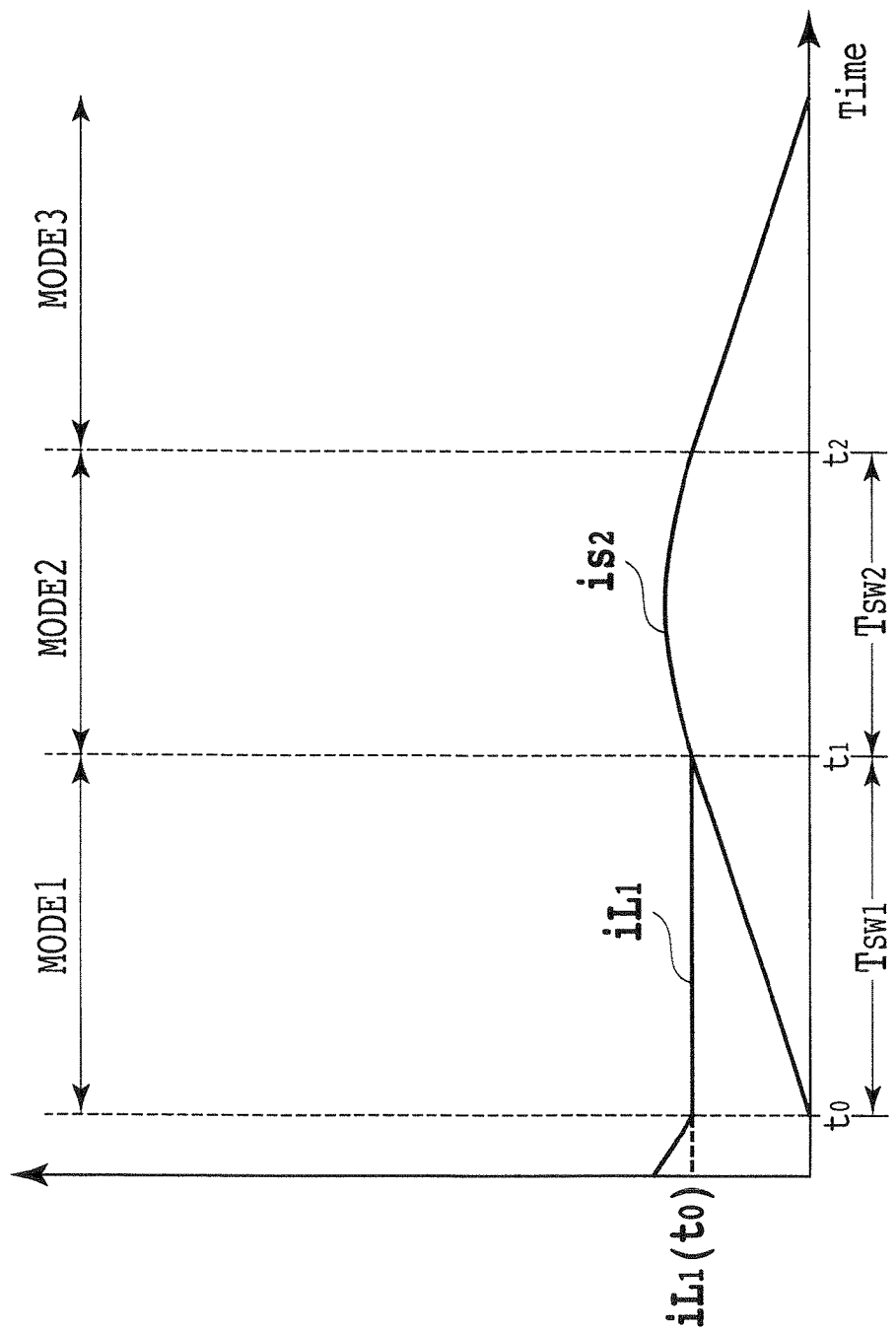
FIG. 4 is a diagram illustrating a recovery current elimination period.

In the following, a calculation method of the recovery current elimination period is described with reference to FIG. 4. The axis of abscissa in FIG. 4 represents time, and the axis of ordinate represents current IS2 flowing through the auxiliary switching device S2 and the main reactor current iL1 flowing through the auxiliary reactor L2. As seen from (2) in FIG. 2, the main reactor current iL1 in the forward direction flows through the output power diode D3 from the main reactor L1. Consequently, charge is accumulated into the output power diode D3. On the other hand, if the auxiliary switching device S2 is turned on, then current for recovery current elimination for discharging charge accumulated in the output power diode D3 flows to the auxiliary switching device S2 in the opposite direction to that in (1) along the route of the output power diode D3→first auxiliary diode D1→auxiliary switching device S2→second auxiliary diode D2→auxiliary reactor L2→dc power supply 1.

When the main reactor current iL1 in the forward direction and the current i in the opposite direction become equal to each other, the current flowing to the output power diode D3 becomes zero and the charge accumulated in the output power diode D3 disappears, and the recovery current when the main switching device S1 turns on disappears. Therefore, the period of time after the auxiliary switching device S2 turns on until the main reactor current iL1 and the current i become equal to each other makes a recovery current elimination period Tsw1 as seen in FIG. 4.

Since a differential voltage (Vout−E) between the output voltage Vout and the input voltage E is applied across the auxiliary reactor L2, where the current flowing to the auxiliary switching device S2 at arbitrary time t is represented by i(t), the following expression (1) is satisfied:

$$L2di(i)/dt = Vout - E \quad (1)$$

where L2 is the inductance of the auxiliary reactor L2. At time t0 at which the auxiliary switching device S2 is turned on, the current i(t0)=0, and it can be assumed that, in the MODE 1 (recovery current elimination period Tsw1), the current i(t) linearly varies as seen in FIG. 4 and can be approximated to the current i(t)=(Vout−E)×(t−t0)/L2.

On the other hand, the current iL1(t) flowing through the main reactor L1 is substantially fixed during the recovery current elimination period Tsw1 and is substantially equal to current iL1(t0) at time t0 because the ripple current decreases by an influence of current flowing through the auxiliary switching device S2. Therefore, time t1 at which i(t1)=iL1(t0) is exhibited is time at which the recovery current disappears, and the time from time t0 to time t1 becomes the recovery current elimination period Tsw1.

Therefore, the recovery current elimination period Tsw1 can be calculated in accordance with the following expression (2):

$$Tsw1 = (t1 - t0) = L2 \times iL0(t0)/(Vout - E) \quad (2)$$

It is to be noted that Vout can be calculated by Vout=E× step-up ratio. In other words, one of Vout and E can be calculated from the step-up ratio and the other one of Vout and E without using a detection signal of the output voltage sensor 10 or the input voltage sensor 6.

After the recovery current elimination period Tsw1 passes, the current of the output power diode D3 decreases to zero, and a return path of the main reactor L1→first auxiliary diode D1→auxiliary switching device S2→second auxiliary diode D2→main reactor L1 is formed as indicated by (4) in FIG. 2. Thus, return current flows along the return path, and the bias from the output power diode D3 to the auxiliary switching device S2 is canceled. Consequently, charge accumulated in the auxiliary capacitor C1 is discharged by a partial resonance circuit formed from the route of the auxiliary capacitor C1→auxiliary switching device S2→second auxiliary diode D2→auxiliary reactor L2→dc power supply 1.

Figure 5:
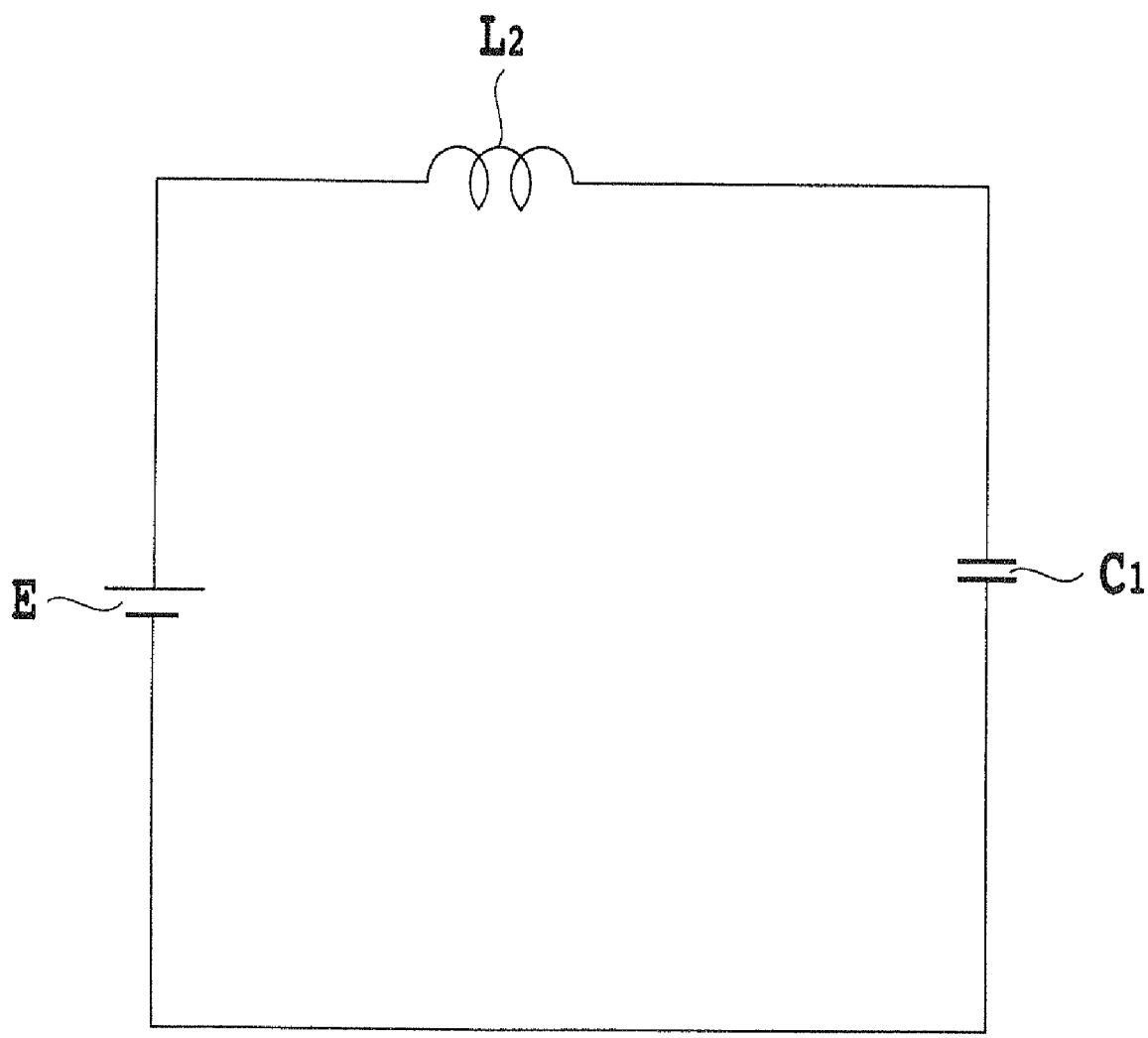
FIG. 5 is a circuit diagram of an equivalent circuit of a partial resonance circuit.

Referring to FIG. 5, the partial resonance circuit is an LC circuit formed from a series circuit of the dc power supply 1, auxiliary reactor L2 and auxiliary capacitor C1. The differential equation of this circuit is represented by the following expression:

$$E = L2di/dt + C1\int v(t)dt \quad (3)$$

where C1 is the capacitance of the auxiliary capacitor C1, and v(t) is the voltage of the auxiliary capacitor C1.

If the expression (3) is solved under the conditions of i(0)=iL1(0) and v(0)=Vout, then within a period (partial resonance period) equal to one half period of one period ω=2π (L2C1)$^{1/2}$, Where Vout≧2E (twice or more the voltage step-up ratio, v(π(L2C1)$^{1/2}$)=0

Where Vout<2E, v(π(L2C1)$^{1/2}$) assumes the minimum value.

Therefore, at time t2 when the partial resonance period (π(L2C1)$^{1/2}$) elapses after the charging starting time of the auxiliary capacitor C1, the charge of the auxiliary capacitor C1 disappears or the remaining charge of the auxiliary capacitor C1 is minimized.

Therefore, the time Tsw2 at which the charge disappears or the remaining charge is minimized after the auxiliary capacitor C1 starts discharging is given by the following expression (4):

$$Tsw2 = \pi(L2C1)^{1/2} \quad (4)$$

When the charge of the auxiliary capacitor C1 disappears, back electromotive force is generated in the auxiliary reactor L2 and the diode D4 turns on. Consequently, a route of the diode D4→first auxiliary diode D1→auxiliary switching device S2→second auxiliary diode D2→auxiliary reactor L2→dc power supply 1→diode D4 is generated, and the MODE 4 is entered. Since the main switching device S1 is turned on at the same time when the diode D4 turns on, ZVZCT operation is carried out and the switching loss of the main switching device S1 can be minimized. On the other hand, even where charge remains in the auxiliary capacitor C1, the loss by the main switching device S1 is minimized by switching on the main switching device S1 at time at which the time $(\pi(L2C1)^{1/2})$ elapses after the charging starting time of the auxiliary capacitor C1.

Therefore, if the time t at present is the time shifted by the variable delay time Td(t) represented by the expression (5) given below from the time at which the main switching device S1 is to be turned on, then the auxiliary SW control section 56 outputs a gate signal for switching on the auxiliary switching device S2 at time t at present. In other words, the auxiliary switching device S2 is turned on prior by Td(t) to the time at which the main switching device S1 is turned on.

$$Td(t)=L2\times iL1(t)/(Vout-E)+\pi(L2C1)^{1/2} \quad (5)$$

where iL1(t) is the current of the main reactor L1 at time t at present.

It is to be noted that the reason why the MODE 1 and the MODE 2 do not overlap with each other is that the second terminal of the auxiliary reactor L2 is biased by the output voltage Vout and has a voltage equal to the voltage of the auxiliary capacitor C1 and, after the MODE 1 ends, the bias to the second terminal of the auxiliary reactor L2 is canceled, whereupon the MODE 2 is entered.

The main SW control section 58 controls turning on/off of the main switching device S1 such that the main switching device S1 exhibits an on state within a pulse width indicated by a pulse width modulation signal outputted from the pulse width modulation circuit 52. Consequently, the auxiliary switching device S2 is turned on prior by Td(t) to the time at which the main switching device S1 turns on.

Figure 6:
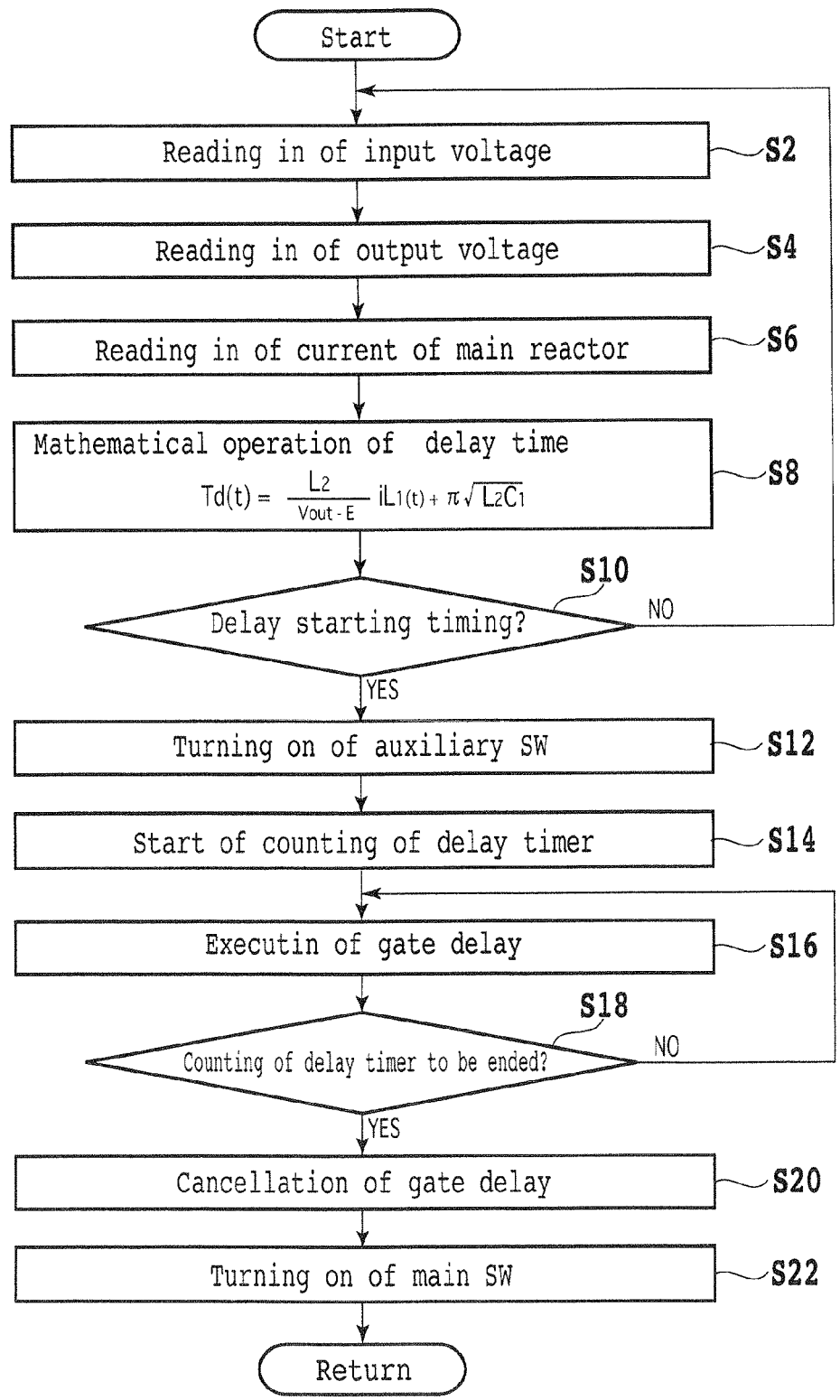
FIG. 6 is a flow chart illustrating control of an auxiliary switching device according to the first embodiment of the present invention.
Figure 7:
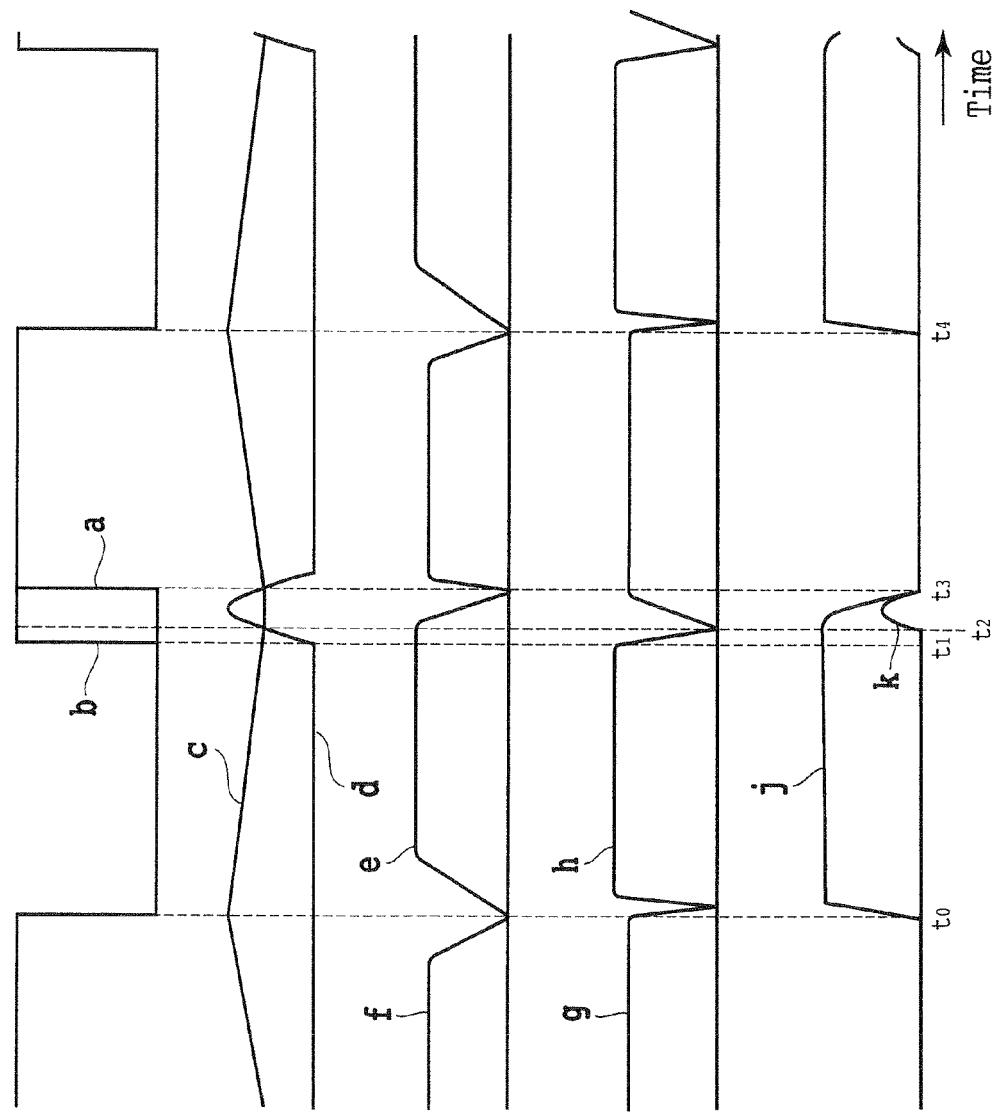

In the following, an operation is described with reference to FIGS. 6 to 7. In FIG. 7, reference character a denotes the gate signal for the main switching device S1; b the gate signal for the auxiliary switching device S2; c the current of the main reactor L1; d the current of the auxiliary switching device S2; e the voltage of the main switching device S1; f the current of the main switching device S1; h the current of the output power diode D3; g the voltage across the output power diode; j the voltage of the auxiliary capacitor C1; and k the charging current of the auxiliary capacitor C1.

At time t0, the main switching device S1 and the auxiliary switching device S2 turn off as indicated by a and b, respectively. Consequently, the MODE 5 is entered, and the auxiliary capacitor C1 is charged. Consequently, the turning off of the main switching device S1 becomes ZVT operation. Further, since the charging of the auxiliary capacitor C1 ends already, no current flows to the auxiliary switching device S2. Therefore, the auxiliary switching device S2 turns off by ZCS operation.

After the auxiliary capacitor C1 is charged until the voltage thereof becomes equal to the voltage of the output side, the output power diode D3 turns on, and the current flows along a route of the auxiliary reactor L2→main reactor L1→output power diode D3. Consequently, the MODE 6 is entered.

The recovery current elimination period calculation section 54 calculates a recovery current elimination period Tsw1(1) at time t at present given below and outputs the recovery current elimination period Tsw1(1) to the auxiliary SW control section 56. Then, the recovery current elimination period calculation section 54 reads in the input voltage E outputted from the input voltage sensor 6 at step S2 in FIG. 6. At step S4, the recovery current elimination period calculation section 54 reads in the output voltage Vout outputted from the output voltage sensor 10. At step S6, the recovery current elimination period calculation section 54 reads in the current iL1(t), which flows through the main reactor L1, outputted from the main reactor current sensor 8. At step S8, the recovery current elimination period calculation section 54 calculates a recovery current elimination period Tsw1(t) represented by an expression (6) given below and adds a partial resonance period Tsw2 to the recovery current elimination period Tsw1 to calculate the variable delay time Td(t) represented by an expression (7) given below. It is to be noted that the variable delay time Td(t) signifies that, when the auxiliary switching device S2 is turned on at time t at present, discharging of the auxiliary capacitor C1 ends and the MODE 3 is entered after time Td(t) elapses.

$$Tsw1(t) = L2 \times iL1(t)/(Vout - E) \quad (6)$$

$$\begin{aligned} Td(t) &= Tsw1(t) + Tsw2 \\ &= L2 \times iL1(t)/(Vout - E) + \pi(L2C1)^{1/2} \end{aligned} \quad (7)$$

The auxiliary SW control section 56 controls turning on of the auxiliary switching device S2 described below. At step S10, the auxiliary SW control section 56 decides whether or not time t at present is prior by the variable delay time Td(t) to the time, at which the main switching device S1 should be turned on, represented by a pulse width modulation signal outputted from the pulse width modulation circuit 52. If the decision is affirmative, then the auxiliary SW control section 56 decides that the time t at present is the delay starting timing, and the processing advances to step S12. On the other hand, if the decision is negative, then the processing returns to step S2.

At step S12, the auxiliary switching device S2 is turned on. For example, it is assumed that the auxiliary switching device S2 is turned on at time t1. Consequently, the MODE 1 is entered, and current flows to the auxiliary switching device S2 indicated by d in FIG. 7 for eliminating the accumulated charge of the output power diode D3 along the output power diode D3→first auxiliary diode D1→auxiliary switching device S2→second auxiliary diode D2→auxiliary reactor L2→dc power supply 1. Then, at time t2 after lapse of the period Tsw1 from time t1, the current flowing through the main reactor 11 and the current flowing through the auxiliary switching device S2 become equal to each other, and the current flowing through the output power diode D3 becomes zero as indicated by h. Then, the accumulated charge in the output power diode D3 disappears, and the MODE 2 is entered. In the MODE 2, discharging of the auxiliary capacitor C1 begins as indicated by k in FIG. 7, and the current flowing through the auxiliary reactor L2 causes LC partial resonance. Thereafter, the energy of the auxiliary capacitor C1 moves to the auxiliary reactor L2. Then, the discharging of the auxiliary capacitor C1 ends and the charge in the auxiliary capacitor C1 disappears, and the voltage of the auxiliary capacitor C1 becomes zero. For example, the auxiliary capacitor C1 becomes zero at time t3 as indicated by j in FIG. 7.

On the other hand, during the period from time t1 to time t3, the auxiliary SW control section 56 carries out the following processes. In particular, at step S14, the auxiliary SW control section 56 sets the variable delay time Td(t) to the delay timer and starts counting of the delay timer. At step S16, the auxiliary SW control section 56 executes gate delaying to leave the main switching device S1 in an off state. At step S18, the auxiliary SW control section 56 decides whether or not the counting of the delay time comes to an end. If the decision is affirmative, then the processing advances to step S20. However, if the decision is negative, then the processing returns to step S16, at which the auxiliary SW control section 56 executes the gate delaying. At step S20, the auxiliary SW control section 56 cancels the gate delaying, and at step S22, the auxiliary SW control section 56 turns on the main switching device S1. For example, the auxiliary SW control section 56 turns on the main switching device S1 at time t3.

At time t3, the voltage of the auxiliary capacitor C1 is zero, and the diode D4 is turned on and the energy accumulated in the auxiliary reactor L2 begins to flow as inverse current. At this time, the main switching device S1 is turned on, and the MODE 3 is entered. Since the diode D4 is on and inverse current flows through the diode D4, the current flowing through the main switching device S1 is suppressed, and the main switching device S5 turns on by ZVZCT operation as indicated by e and f in FIG. 7. At time t4, the main switching device S1 and the auxiliary switching device S2 turn off.

FIG. 8 illustrates voltages a1, a2 and a3 and current bh, b2 and b3 of the auxiliary switching device S2 and voltages c1, c2 and c3 and current d1, d2 and d3 of the main switching device S1 in the case of the output power of 5 kW, 12.5 kW and 25 kW, respectively, where L1=60 μH, L2=1 μH, load 14=32Ω, C3=0.1 μF, E=200 V, Vout=400 V, the on-duty is 50% and the step-up ratio is twice. At the output power of 5 kW, the delay time Td1=1.1 μs; at the output power of 12.5 kW, the delay time Td2=1.3 μs; and at the output power of 25 kW, the delay time Td3=1.5 μs. Thus, it can be recognized that, when the output voltage is varied while the output voltage Vout is fixed, as the output voltage increases, the main reactor current iL1 increases and the delay time Td increases.

Figure 9:
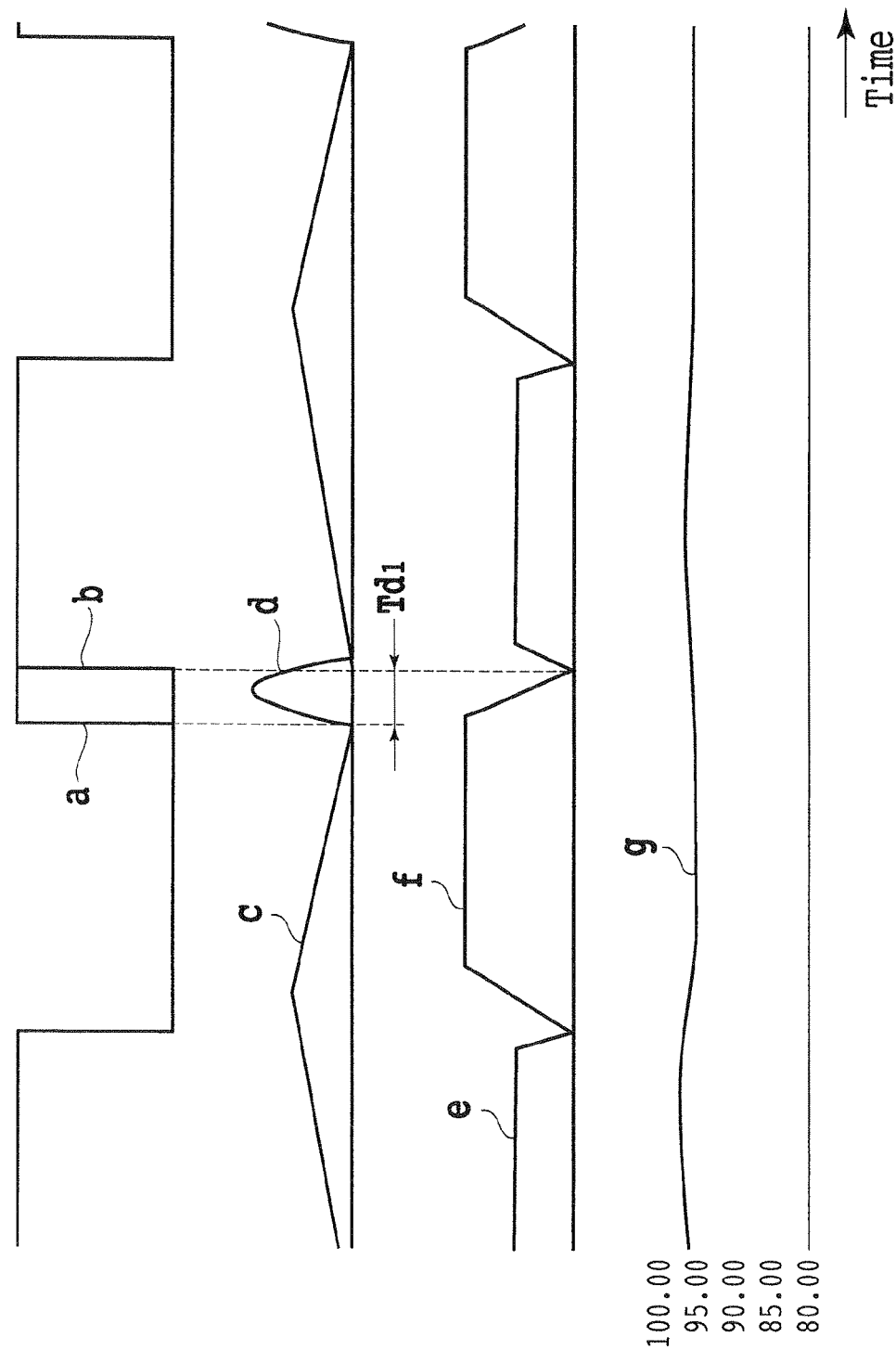
FIG. 9 is a time chart illustrating an effect of the first embodiment of the present invention.
Figure 10:
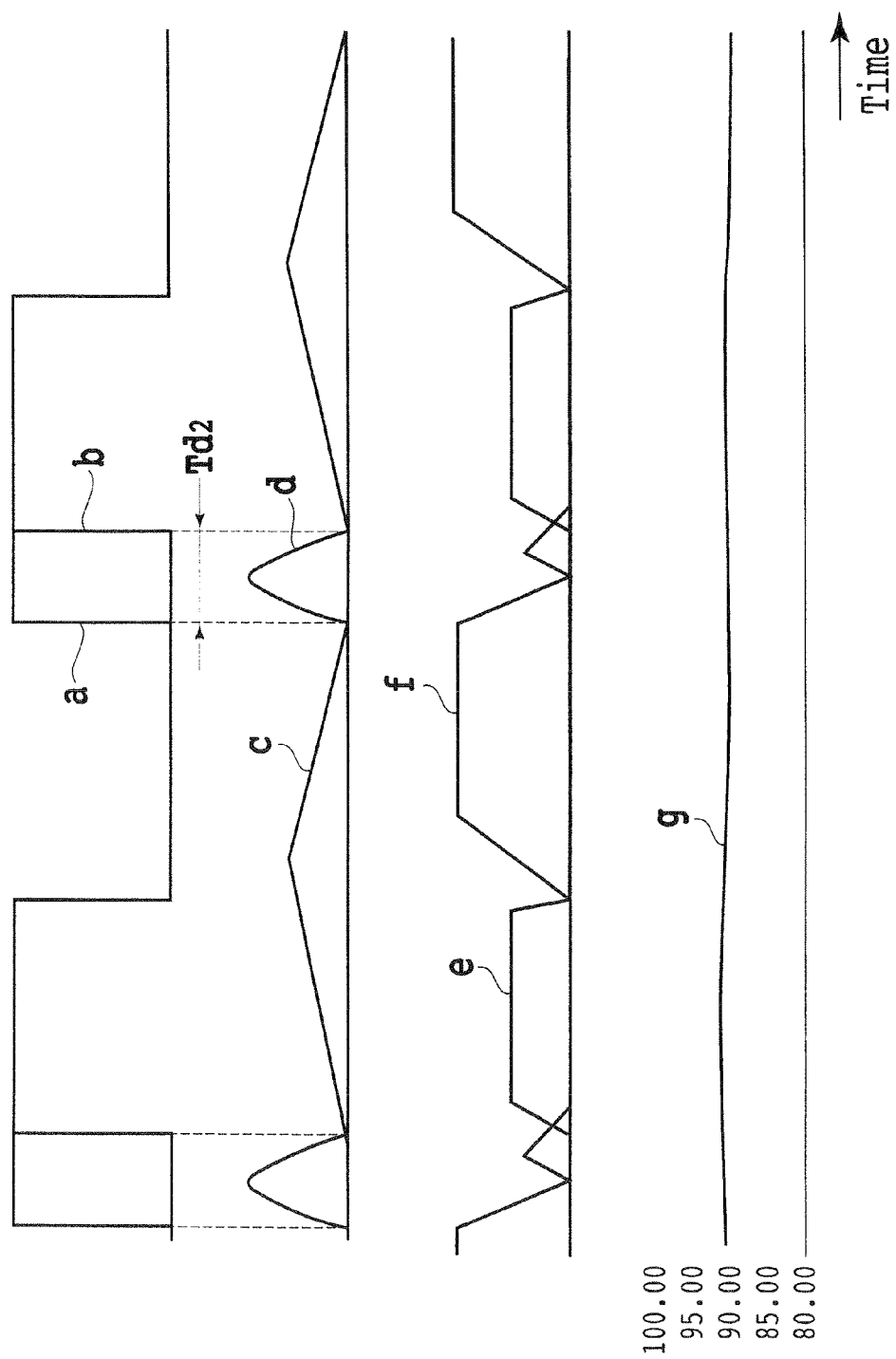
FIG. 10 is a time chart illustrating a problem of the conventional art.

FIG. 9 illustrates a result of application of the present embodiment wherein L1=48 pH, L2=2 μH, C1=0.05 μF, load 14=160 Ω and the output power is 1 kW. Meanwhile, FIG. 10 illustrates a result of application of the related art wherein the output power is 1 kW and the fixed delay time is optimized to 8 kW. In FIGS. 9 and 10, reference character a denotes the gate signal for the auxiliary switching device S2, b the gate signal for the main switching device S1, c the current of the main reactor L1, d the current of the auxiliary switching device S2, e the current of the main switching device S1, f the voltage of the main switching device S1, and g the efficiency (output current×output voltage/input current×input voltage).

As seen in FIG. 9, in the present embodiment, the delay time Td1 is optimized to 1 kW. On the other hand, if the fixed delay time Td2 optimized at 8 kW is applied to the case of 1 kW, then since the fixed delay time Td2 is excessively longer than the optimum delay time Td1, the period of time during which current flows through the auxiliary switching device S2 becomes longer and the resistance loss of the auxiliary switching device S2 increases. As a result, the present embodiment exhibits an improved efficiency when compared with that of the prior art as seen from g in FIGS. 9 and 10.

Figure 11:
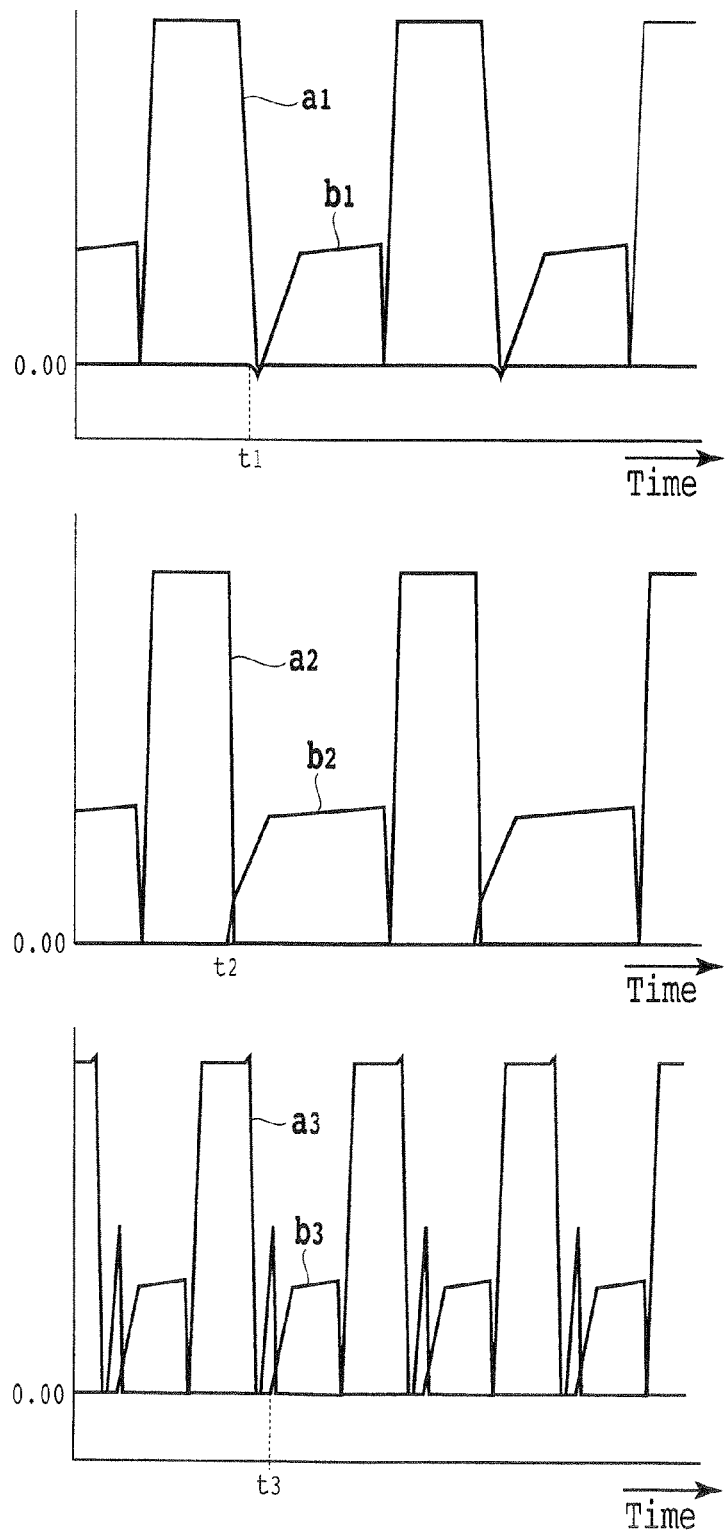
FIGS. 11 and 12 are diagrams illustrating effects of the first embodiment of the present invention and problems of the conventional art.
Figure 12:
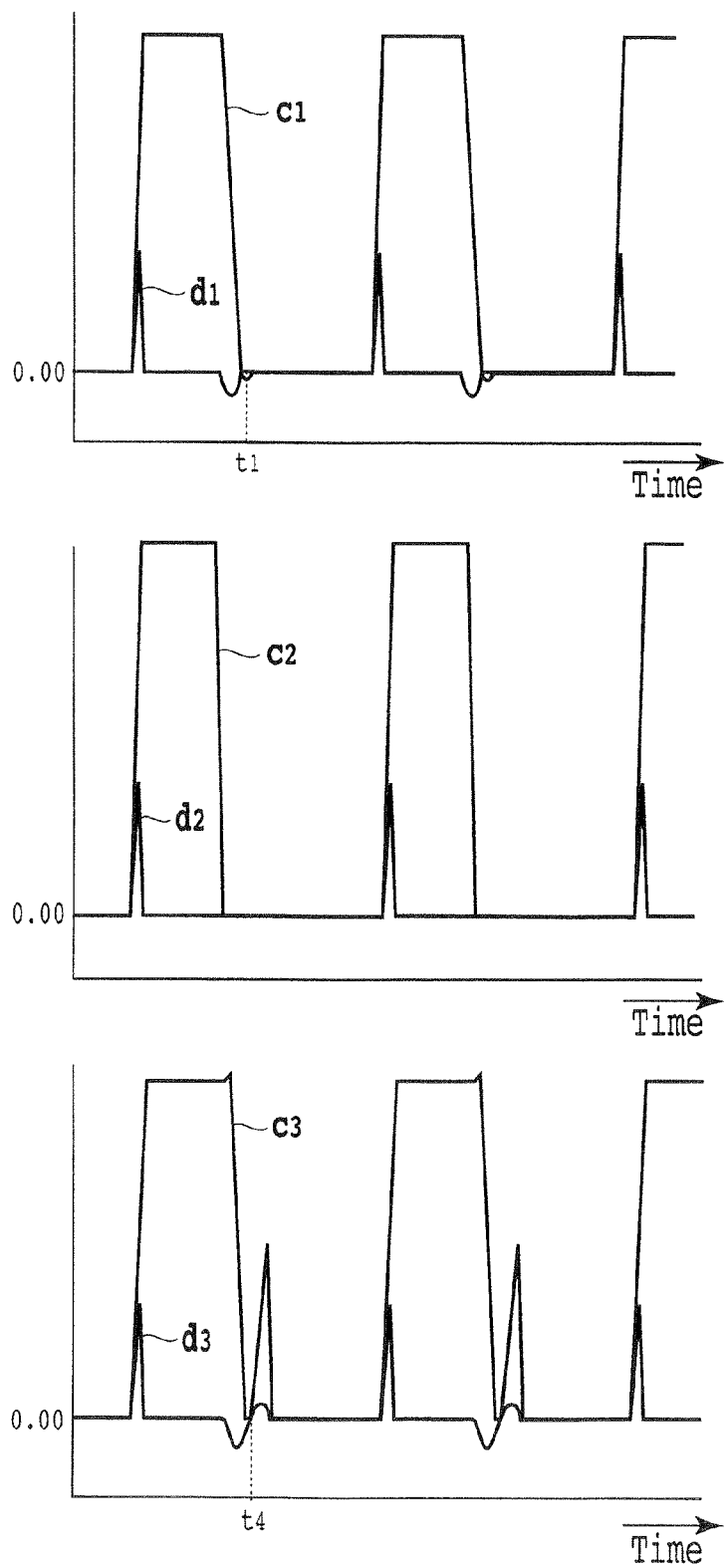

FIGS. 11 and 12 illustrate voltages and currents when the delay time is set to 2.0 μs, 1.0 μs and 3.0 μs where L1=48 μH, L2=2 μH, C1=0.05 μF, the load 14=10Ω, the output power=450 to 600 V (approximately 25 kW), the optimum delay time is fixed at 2.0 μs and the output voltage is varied among three different values. In FIG. 11, reference characters a1, a2 and a3 denote the voltage of the main switching device S1; b1, b2 and b3 the current of the main switching device S1.

In FIG. 12, reference characters c1, c2 and c3 denote the voltages of the auxiliary capacitor C1; and d1, d2 and d3 the current of the auxiliary capacitor C1.

Where the delay time is equal to the optimum delay time of 2.0 μs, since the main switching device S1 turns on at time t1 at which the voltage of the auxiliary capacitor C1 becomes zero as indicated by c1 and d1, ZVZCT operation is carried out.

Where the delay time is 1.0 μs which is shorter than the optimum delay time of 2.0 μs, since the discharging of the auxiliary capacitor C1 is not completed at time t2 at which the main switching device S1 turns on as seen from c2 and d2, the diode D4 remains in an off state and the main switching device S1 switches by hard switching as seen from a2 and b2. Therefore, the switching loss of the main switching device S1 increases.

Where the delay time is 3.0 μs which is longer than the optimum delay time of 2.0 μs, since the main switching device S1 does not turn on at time t4 at which the discharging of the auxiliary capacitor C1 is completed as seen from c3 and d3, the voltage of the main switching device S1 oscillates by damped oscillation through a resonance loop of the dc power supply 1→auxiliary reactor L2→main reactor L1→first auxiliary diode D1→auxiliary capacitor C1→do power supply 1 by charge of the snubber circuit formed from the partial resonance circuit of the main reactor L1, auxiliary reactor L2 and auxiliary capacitor C1 in addition to the return loop of the auxiliary reactor L2→do power supply 1→diode D4→first auxiliary diode D1→auxiliary switching device S2→second auxiliary diode D2→auxiliary reactor L2 at time t4. Consequently, as seen from a3 and b3, soft switching of the main switching device S1 cannot be implemented at time t3 at which the main switching device S1 turns on. Therefore, the switching loss of the main switching device S1 increases in addition to the resistance loss of the auxiliary switching device S2.

Figure 13:
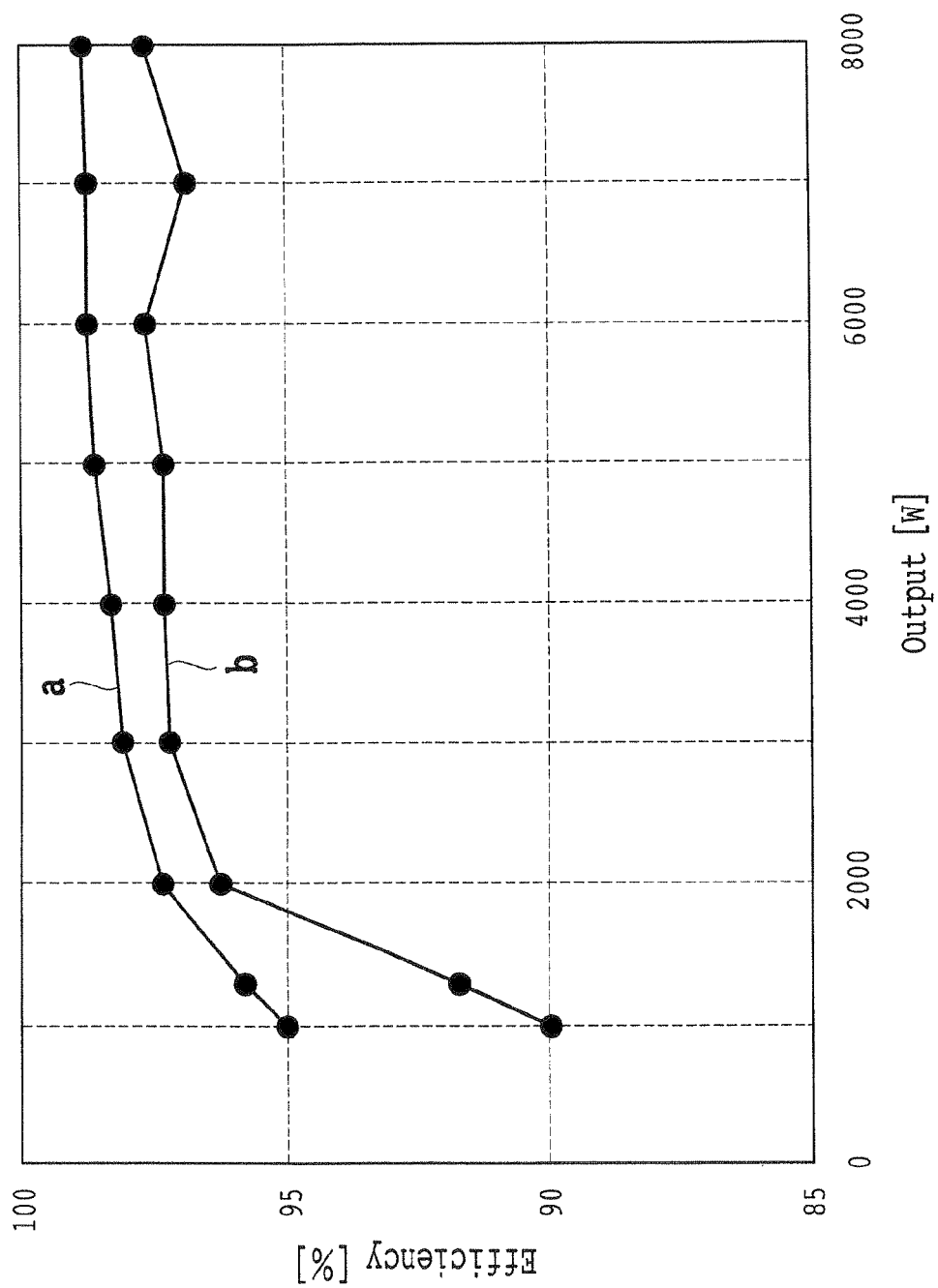
FIG. 13 is a diagram illustrating an effect of the first embodiment of the present invention.

FIG. 13 illustrates the efficiency a where variable delay control according to the embodiment of the present invention is carried out and the efficiency b where conventional fixed delay control is carried out. The axis of abscissa indicates the output power and the axis of ordinate indicates the efficiency. In FIG. 13, the efficiencies a and b where the input voltage E=200 V and the output voltage Vout=400 V and besides the output current is varied to vary the output power from 1 kW to 8 kW. It can be seen in FIG. 13 that, according to the embodiment of the present invention, the efficiency is improved when compared with that where the conventional delay control is carried out.

As described above, according to the present embodiment, a recovery current elimination period is calculated, and the auxiliary switching device S2 is turned on prior by delay time Td to the main switching device S1 based on the recovery current elimination period and time in which the charge of the auxiliary capacitor C1 is eliminated or minimized by the partial resonance circuit. Therefore, the main switching device S1 can be turned on at the time at which the charge of the auxiliary capacitor C1 disappears, and the main switching device S can turn on by ZVZCT operation and the switching loss of the main switching device S1 can be reduced. Accordingly, since soft switching can be implemented in all input and output conditions, reduction in size, increase in efficiency and increase in density of the circuitry can be anticipated.

Second Embodiment

Figure 14:
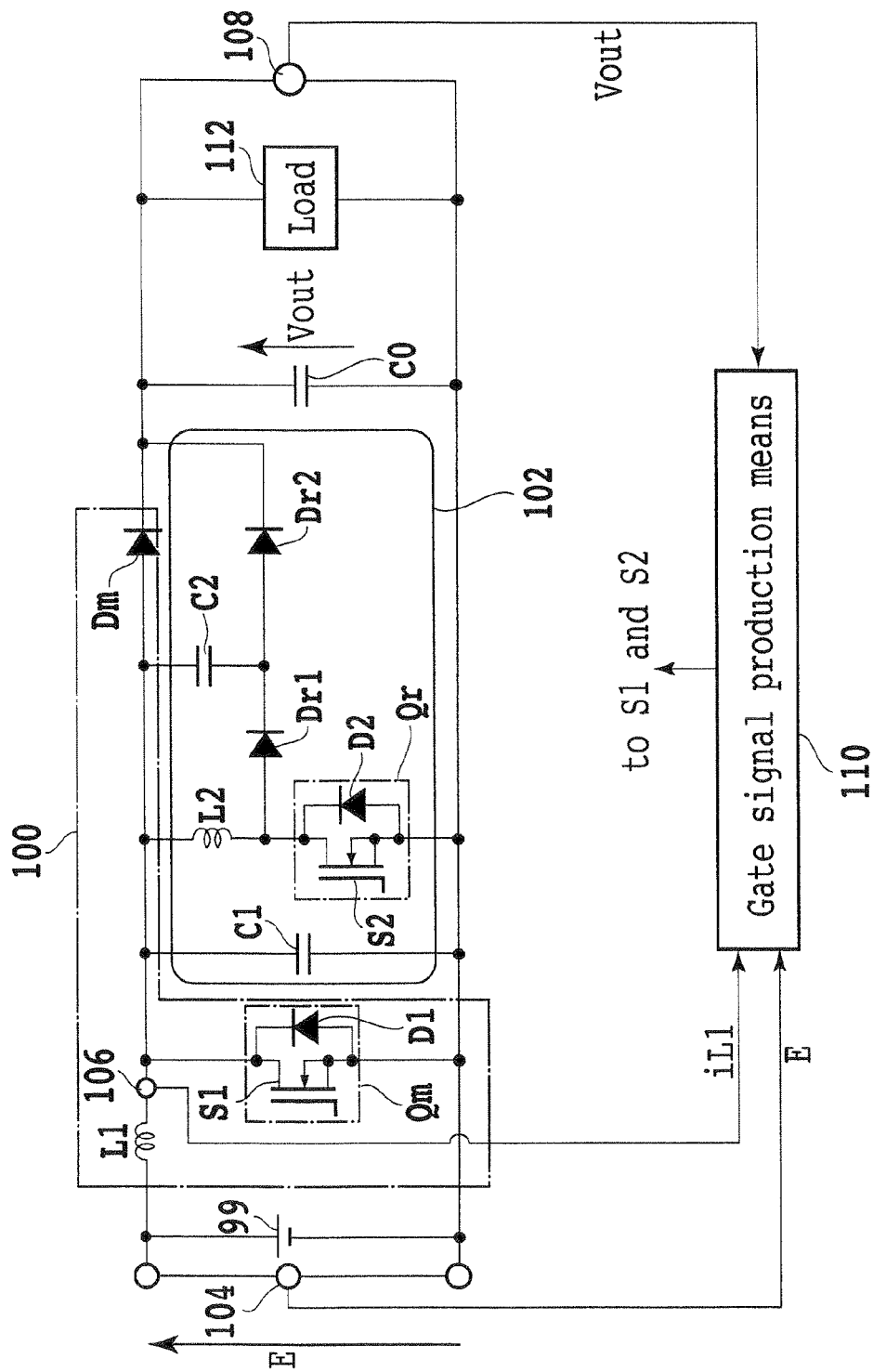
FIG. 14 is a circuit diagram showing a ZVT voltage step-up circuit according to a second embodiment of the present invention.

FIG. 14 is a circuit diagram showing a configuration of a ZVT voltage step-up circuit as a resonance type electric power conversion apparatus according to a second embodiment of the present invention. Referring to FIG. 14, the ZVT voltage step-up circuit includes a do power supply 99, a main circuit 100, an auxiliary circuit 102, an input voltage sensor 104, a main reactor current sensor 106, an output voltage sensor 108, a gate signal production means 110 and a load 112.

The do power supply 99 is substantially same as the do power supply 1 described hereinabove with reference to FIG. 1, and overlapping description of the do power supply 99 is omitted herein. The auxiliary circuit 102 includes a main reactor L1, a main SWQm and an output power diode Dm and is a circuit which boosts the voltage through the dc power supply 99 and the main reactor L1 based on on/off of the main switching device S1 in the main SWQm. The main reactor L1 is connected at a first terminal thereof to the positive electrode of the do power supply 99 and at a second terminal thereof to the anode of the output power diode Dm and a first terminal of the auxiliary reactor L2 in the auxiliary circuit 102.

The main switching device S1 is, for example, an IGBT device and is connected at the collector thereof to the second terminal of the main reactor L1 and at the emitter thereof to the negative electrode of the do power supply 99. A gate signal for turning on/off the main switching device S1 is inputted to the gate of the main switching device S1 from the gate signal production means 110. The first auxiliary diode D1 is connected at the anode thereof to the emitter of the main switching device S1 and at the cathode thereof to the collector of the main switching device S1. The output power diode Dm is connected at the anode thereof to the second terminal of the main reactor L1 and at the cathode thereof to the load 112 and the first terminal of the capacitor C0.

The auxiliary circuit 102 includes an auxiliary reactor L2, first and second auxiliary diodes Dr1 and Dr2, an auxiliary SWQr, and first and second auxiliary capacitors C1 and C2 and forms a recovery current elimination circuit for discharging charge accumulated in the output power diode Dm to eliminate the recovery current and a partial resonance circuit for discharging charge accumulated in the auxiliary capacitor C1.

The auxiliary reactor L2 is connected at the first terminal thereof to the second terminal of the main reactor L1 through the main reactor current sensor 106 and at the second terminal thereof to the cathode of the auxiliary switching device S2 of the auxiliary SWQr. The auxiliary SWQr includes the auxiliary switching device S2 and the second auxiliary diode D2 connected in inverse-parallel. The auxiliary switching device S2 is connected at the collector thereof to the second terminal of the auxiliary reactor L2 and at the emitter thereof to the negative electrode of the dc power supply 99. A gate signal from the gate signal production means 110 is inputted to the gate of the auxiliary switching device S2. The second auxiliary diode D2 is connected in inverse-parallel to the auxiliary switching device S2, and is connected at the anode thereof to the emitter of the auxiliary switching device S2 and at the cathode thereof to the collector of the auxiliary switching device S2.

The first auxiliary diode Dr1 is connected at the anode thereof to the second terminal of the auxiliary reactor L2 and at the cathode thereof to the second terminal of the second auxiliary capacitor C2 and the cathode of the second auxiliary diode Dr2. The second auxiliary diode Dr2 is connected at the anode thereof to the cathode of the first auxiliary diode Dr1 and the second terminal of the second auxiliary capacitor C2 and at the cathode thereof to the cathode of the output power diode Dm. The second auxiliary capacitor C2 is provided to carry out turnoff compensation of the auxiliary switching device S2 and is connected at the first terminal thereof to the anode of the output power diode Dm and at the second terminal thereof to the cathode of the first auxiliary diode Dr1.

The auxiliary reactor L2 and the auxiliary switching device S2 form a recovery current elimination circuit for discharging charge accumulated in the output power diode Dm through a route of the auxiliary reactor L2→auxiliary switching device S2. The auxiliary capacitor C1 and the auxiliary reactor L2 form a partial resonance circuit for discharging charge accumulated in the auxiliary capacitor C1 along a path of the auxiliary capacitor C1→auxiliary reactor L2→auxiliary switching device S2.

The input voltage sensor 104 detects the input voltage E of the dc power supply 99 and outputs an electric signal corresponding to the input voltage E to the gate signal production means 110. As shown in FIG. 14, the main reactor current sensor 106 is connected to a point located further upstream (in the forward current direction) of the branching point from which the second terminal of the main reactor L1 branches to the first terminal of the auxiliary reactor L2, or connected to the first terminal of the main reactor L1. The main reactor current sensor 106 detects the main reactor current iL1 flowing through the main reactor L1 and outputs an electric signal corresponding to the main reactor current iL1 to the gate signal production means 110. The output voltage sensor 108 detects the output voltage Vout across the load 112 and outputs an electric signal corresponding to the output voltage Vout to the gate signal production means 110.

The capacitor C0 is a smoothing capacitor and is connected to the cathode of the output power diode Dm and the negative electrode side of the do power supply 99. The load 112 is connected to the cathode of the output power diode Dm and the negative electrode of the do power supply 99.

In the following, operation of the ZVT voltage step-up circuit is described. In the ZVT voltage step-up circuit, the MODE 1 to the MODE 6 described below are repeated. FIG. 15 illustrates the MODE 1 to the MODE 6.

The MODE 1 is a state wherein the auxiliary switching device S2 is turned on in a state wherein the auxiliary capacitor C1 is charged to eliminate the accumulated charge of the output power diode Dm. As seen from (1), current for eliminating the accumulated charge of the output power diode Dm flows along a route of the output power diode Dm→auxiliary reactor L2→auxiliary switching device S2→negative electrode side of the do power supply 99. Here, the current indicated by (1) turns on by ZCS (zero current switching) because of the presence of the auxiliary reactor L2.

On the other hand, current in the forward direction flows along a route of the do power supply 99→main reactor L1→output power diode Dm→load 112 as seen from (2). In the MODE 1, the main switching device S1 remains in an off state, and the turning on of the auxiliary switching device S2 is controlled so that the main switching device S1 is turned on at the time at which the MODE 3 is started, that is, the auxiliary switching device S2 turns on prior by the variable delay time Td(t) to the time at which the main switching device S1 turns on as hereinafter described.

The MODE 2 is a state of a resonance mode wherein the current flowing through the main reactor L1 and the current flowing through the auxiliary switching device S2 become equal to each other and the current to flow through the output power diode D3 becomes zero to turn on the auxiliary switching device S2. In this state, the current flowing through the output power diode Dm is zero. The bias from the output power diode Dm is eliminated from the second terminal of the auxiliary reactor L2, and an LC partial resonance circuit is formed from the auxiliary capacitor C1→auxiliary reactor L2→auxiliary switching device S2 as seen from (3). Consequently, discharging of the auxiliary capacitor C1 starts, and the current flowing through the auxiliary reactor L2 LC resonates. Thereafter, the energy of the auxiliary capacitor C1 moves into the auxiliary reactor L2. Then, the discharging of the auxiliary capacitor C1 ends and the charge of the auxiliary capacitor C1 disappears, and the voltage of the auxiliary capacitor C1 becomes zero. Meanwhile, the current from the auxiliary reactor L2 joins to the current indicated by (3) as indicated by (4).

The MODE 3 is a state wherein the voltage of the auxiliary capacitor C1 is zero and turning on of the main switching device S1 is carried out as ZVT operation. In this state, the first auxiliary diode D1 exhibits an on state and the energy accumulated in the auxiliary reactor L2 begins to flow as inverse current along a route of the first auxiliary diode D1→auxiliary reactor L2→auxiliary switching device S2 as indicated by (5). At this time, the main switching device S1 turns on. Consequently, since the first auxiliary diode D1 is on and inverse current flows through the diode D4, the current flowing through the main switching device S1 is suppressed and ZCS operation occurs. Meanwhile, the current flowing through the main reactor L1 joins with the current indicated by (5) as indicated by (6).

The MODE 4 is a state wherein the main switching device S1 is on. In this state, current flows along a route of the dc power supply 99→main reactor L1→main switching device S1 as indicated by (7) and the energy is accumulated into the main reactor L1.

The MODE 5 is a state wherein the main switching device S1 and the auxiliary switching device S2 are off. In this state, since discharging of the auxiliary capacitor C1 ends already, no current flows through the auxiliary switching device S2. Therefore, the auxiliary switching device S2 turns off by ZCS operation. Further, current flows along a route of the main reactor L1→first auxiliary capacitor C1 as indicated by (8), and the auxiliary capacitor C1 is charged. As the auxiliary capacitor C1 is charged, the turning off of the main switching device S1 becomes ZVT operation.

The MODE 6 is a state wherein the main switching device S1 is off. When the auxiliary capacitor C1 is charged until the voltage thereof becomes equal to the voltage on the output side, the output power diode Dm turns on, and current flows along a route of the main reactor L1→output power diode Dm as indicated by (9).

Although the MODE 1 to the MODE 6 described above are repeated, the ZVT voltage step-up circuit operates similarly as in the operation of the SAZZ voltage step-up circuit as described above, and particularly the MODE 1 and the MODE 2 can be handled similarly to those of the SAZZ voltage step-up circuit described above. It is to be noted that the reason why the MODE 1 and the MODE 2 do not overlap with each other is that the potential at the first terminal of the auxiliary capacitor C1 is equal to the output voltage Vout and, after the recovery current elimination period Tsw1 elapses, the bias to the first terminal of the auxiliary reactor L2 from the output power diode D3 is canceled.

The gate signal production means 110 produces gate signals for turning on/off the main switching device S1 and the auxiliary switching device S2. In particular, the gate signal production means 110 outputs gate signals to the main switching device S1 and the auxiliary switching device S2 such that the auxiliary switching device S2 is turned on prior by the variable delay time Td(t) to turning on of the main switching device S1 similarly as in the first embodiment and the main switching device S1 exhibits an on state for a period of time equal to the pulse width defined by the duty ratio according to the input voltage E and the output voltage Vout.

Figure 16:
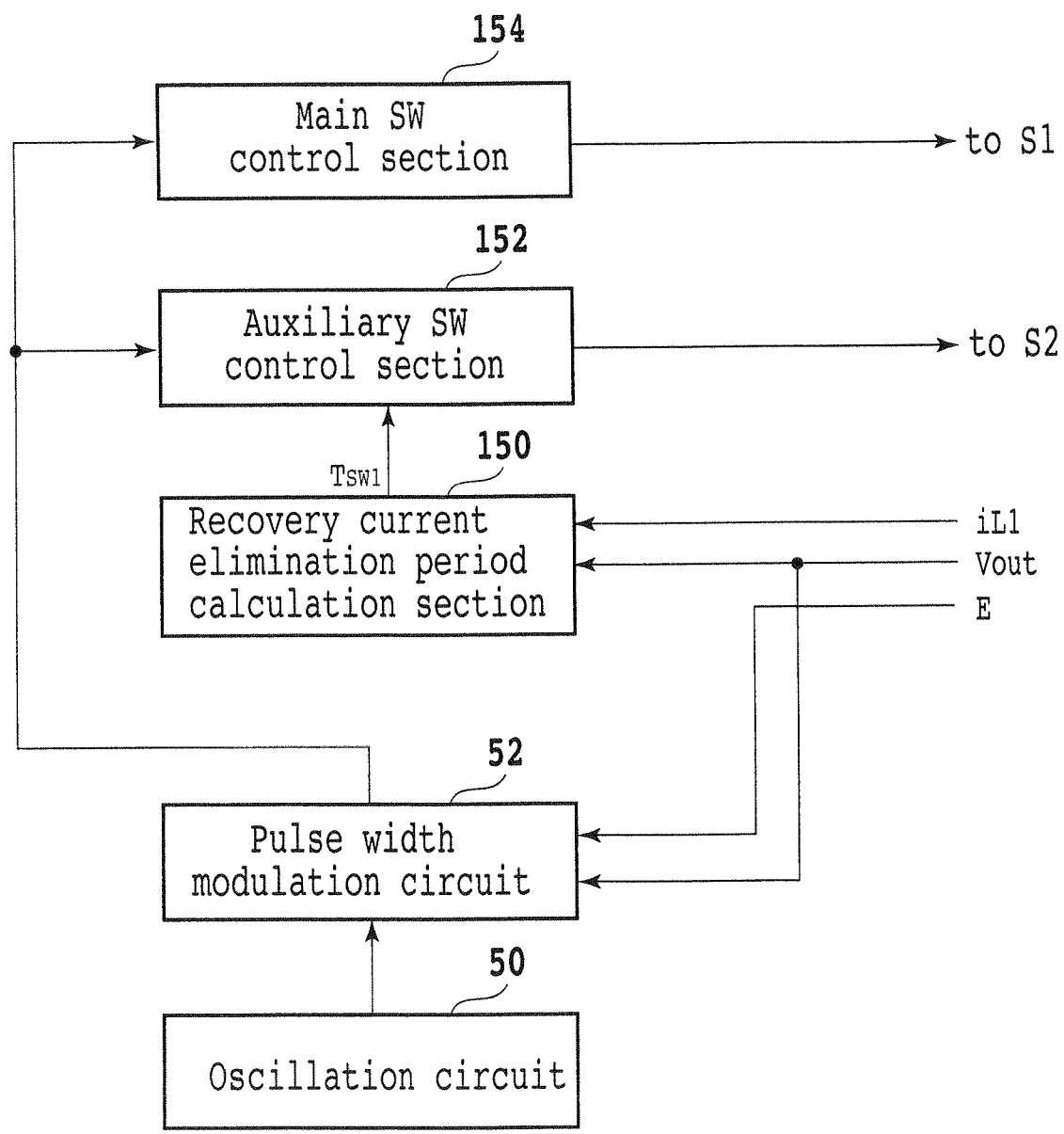
FIG. 16 is a functional block diagram of gate signal production means shown in FIG. 14.

FIG. 16 is a functional block diagram of the gate signal production means 110, and in FIG. 16, substantially like elements to those in FIG. 3 are denoted by like reference characters. Referring to FIG. 16, the gate signal production means 110 shown includes an oscillation circuit 50, a pulse width modulation circuit 52, a recovery current elimination period calculation section 150, an auxiliary SW control section 152 and a main SW control section 154. The recovery current elimination period calculation section 150 calculates a recovery current elimination period which is a period of time until the charge accumulated in the output power diode Dm is discharged through the recovery current elimination circuit. Although the recovery current elimination period Tsw1 can be calculated similarly as in the first embodiment, since the voltage applied across the auxiliary reactor L2 is the output voltage Vout, the recovery current elimination period Tsw1 can be determined by the following expression (8):

$$Tsw1 = L2 \times iL1(t)/Vout \quad (8)$$

where L2 is the inductance of the auxiliary reactor L2, and iL1(t) the current flowing through the main reactor L1 at time t at present.

The auxiliary SW control section 152 turns on the auxiliary switching device S2 if the time t at present is prior by the variable delay time Td(t) indicated by the following expression (9) to the time at which the auxiliary switching device S2 is to be turned on:

$$Td(t) = L2 \times iL1(t)/Vout + \pi(L2C1)^{1/2} \quad (9)$$

where C1 is the capacitance of the auxiliary capacitor C1.

$\pi(L2C1)^{1/2}$ of the second term represents the time or partial resonance period in which the charge of the auxiliary capacitor C1 disappears or is minimized by discharge similarly as in the first embodiment.

The main SW control section 154 controls turning on/off of the main switching device S1 so that the main switching device S1 has an on state for a period of time equal to the pulse width indicated by a pulse width modulation signal outputted from the pulse width modulation circuit 52.

Figure 17:
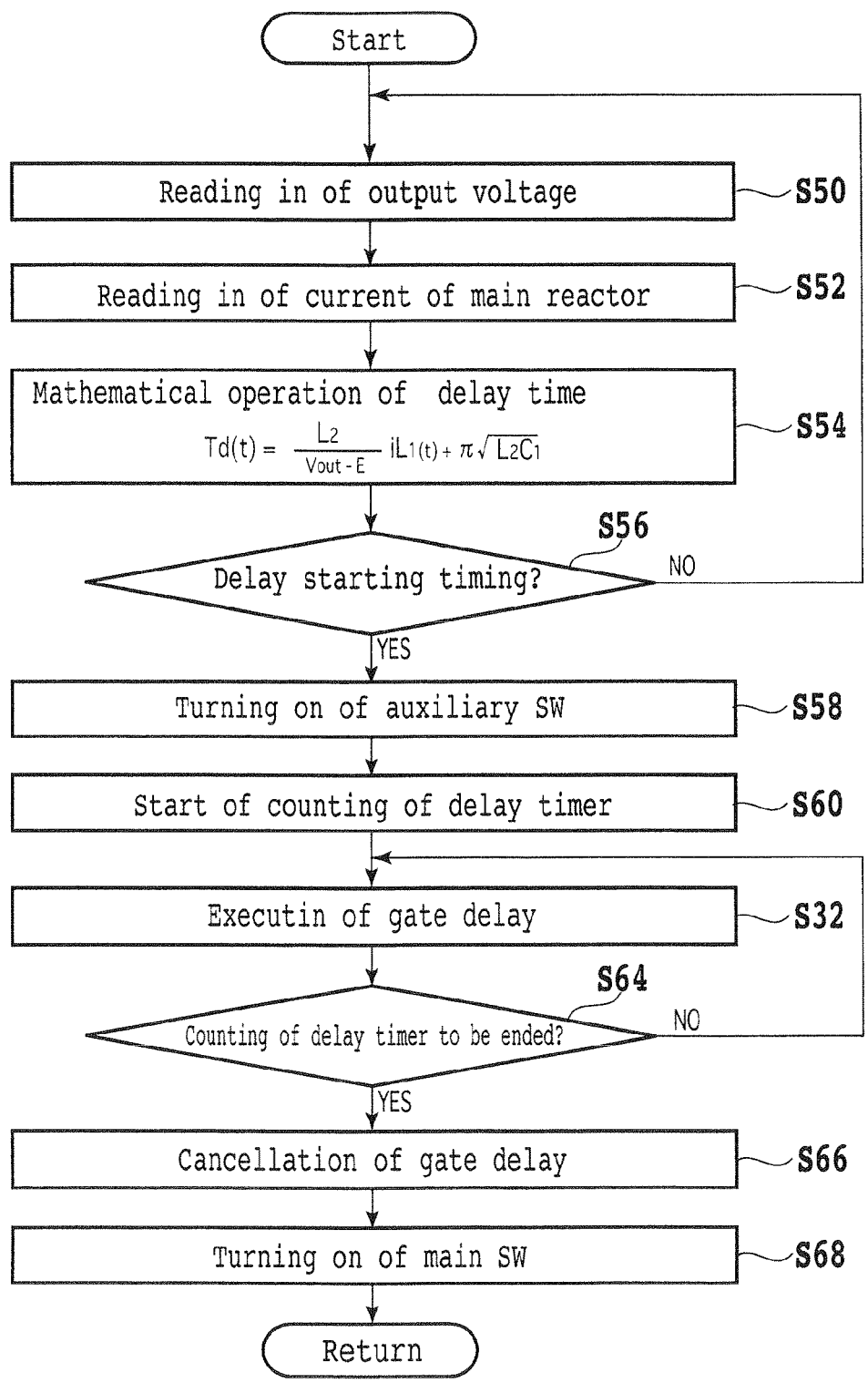
FIG. 17 is a flow chart illustrating control of an auxiliary switching device according to the second embodiment of the present invention.

FIG. 17 is a flow chart illustrating operation of the recovery current elimination period calculation section 150 and the auxiliary SW control section 152. At step S50, the output voltage Vout is read in. At step S52, the current iL1(t) is read in. At step S54, the variable delay time Td(t) represented by the expression (9) is calculated. At step S56, it is decided whether or not the time t at present is prior by the variable delay time Td(t) to the time, indicated by the pulse width modulation signal outputted from the pulse width modulation circuit 52, at which the main switching device S1 is to be turned on. If the decision is affirmative, then it is decided that the time t at present is the delay starting timing, and the processing advances to step S58. However, if the decision is negative, then the processing returns to step S50. At steps S58 to S68, processes similar to those at steps S12 to S22 described hereinabove with reference to FIG. 6 are carried out.

From the foregoing, also in the case of the ZVT voltage step-up circuit, soft switching can be carried out similarly as in the SAZZ voltage step-up circuit, and the switching loss and the resistance loss can be reduced and the efficiency is improved when compared with those of the prior art wherein the auxiliary switching device S2 is turned on prior by a fixed delay period to the main switching device S1.

Third Embodiment

Figure 18:
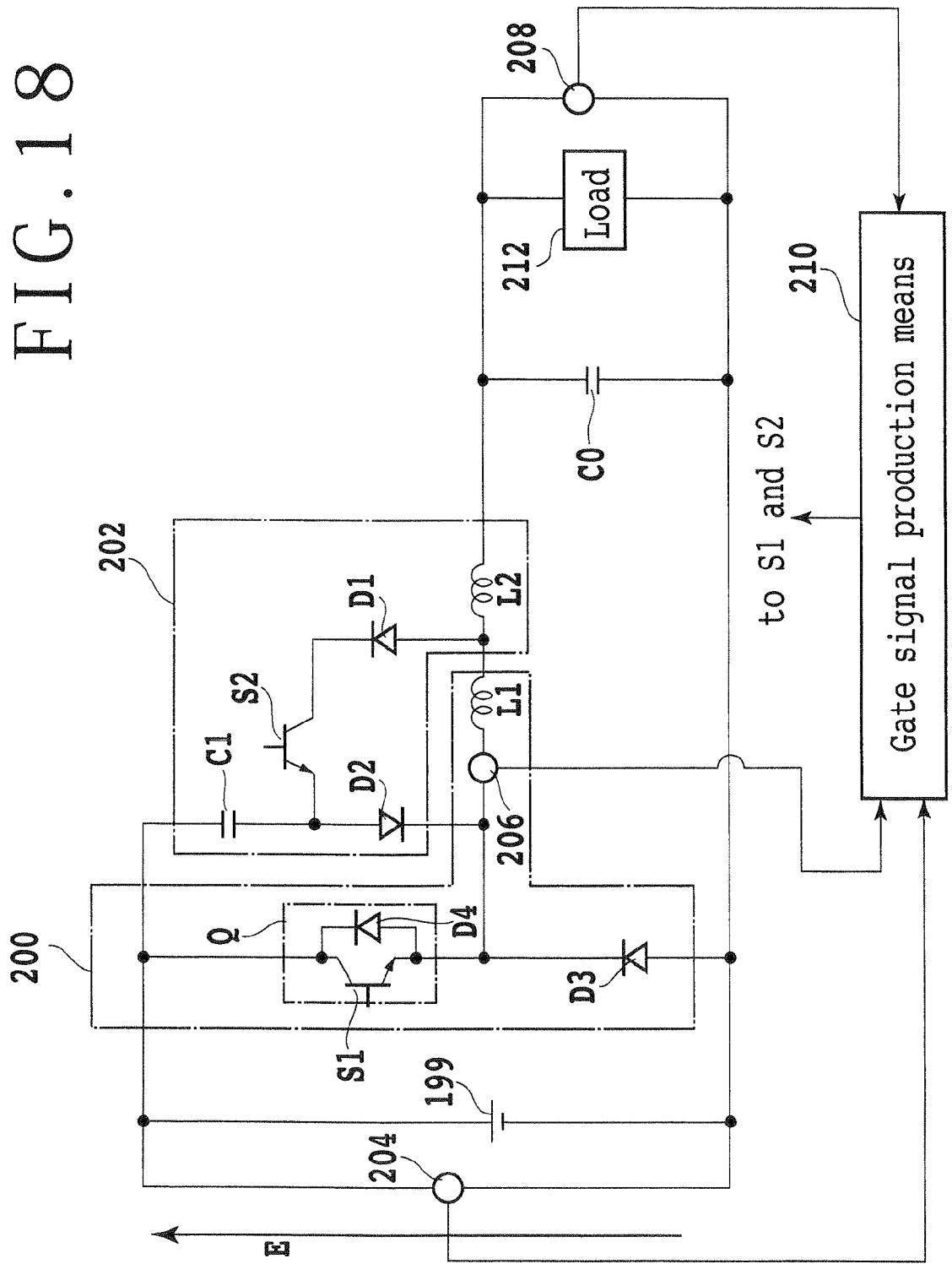
FIG. 18 is a circuit diagram showing a SAZZ voltage step-down circuit according to a third embodiment of the present invention.

FIG. 18 is a circuit diagram of a SAZZ voltage step-down circuit as a resonance type electric power conversion apparatus according to a third embodiment of the present invention. Referring to FIG. 18, the SAZZ voltage step-down circuit includes a do power supply 199, a main circuit 200, an auxiliary circuit 202, an input voltage sensor 204, a main rector current sensor 206, an output voltage sensor 208, gate signal production means 210 and a load 212.

The dc power supply 199 is substantially same as the dc power supply 1 described hereinabove with reference to FIG. 1, and therefore, overlapping description thereof is omitted herein. The main circuit 200 includes a main reactor L1, a main SWQ, and a return diode D3 and steps down the input voltage E through the do power supply 199 and the main reactor L1 based on on/off of the main switching device S1 in the main SWQ.

The main SWQ includes the main switching device S1 and the diode D4 connected in inverse-parallel. The main switching device S1 is, for example, an IGBT device, and is connected at the emitter thereof to the positive electrode of the do power supply 199 and at the collector thereof to the cathode of the return diode D3 and a first terminal of the main reactor L1. A gate signal for turning on/off the main switching device S1 is applied to the gate of the main switching device S1 from the gate signal production means 210. The main reactor L1 is connected at a first terminal thereof to the emitter of the main switching device S1 and the cathode of the return diode D3 through the main rector current sensor 206 and at a second terminal thereof to a first terminal of the auxiliary reactor L2 in the auxiliary circuit 202. The return diode D3 is connected at the anode thereof to the negative electrode of the do power supply 199 and at the cathode thereof to the first terminal of the main reactor L1 through the main rector current sensor 206.

The auxiliary circuit 202 includes an auxiliary reactor L2, first and second auxiliary diodes D1 and D2, an auxiliary switching device S2 and an auxiliary capacitor C1 and forms a recovery current elimination circuit for discharging the charge accumulated in the return diode D3 to eliminate the recovery current and a partial resonance circuit for discharging the charge accumulated in the auxiliary capacitor C1.

The auxiliary reactor L2 is connected at a first terminal thereof to the second terminal of the main reactor L1 and at a second terminal thereof to the load 212 side. The first auxiliary diode D1 is connected at the anode thereof to first terminal of the auxiliary reactor L2 and at the cathode thereof to the collector of the auxiliary switching device S2. The auxiliary switching device S2 is connected at the collector thereof to the cathode of the first auxiliary diode D1 and at the emitter thereof to the anode of the second auxiliary diode D2. The second auxiliary diode D2 is connected at the anode thereof to the emitter of the auxiliary switching device S2 and the second terminal of the auxiliary capacitor C1 and at the cathode thereof to the first terminal of the main reactor L1. The auxiliary capacitor C1 is connected at a first terminal thereof to the positive electrode of the dc power supply 99 and at the second terminal thereof to the emitter of the auxiliary switching device S2 and the anode of the second auxiliary diode D2.

The input voltage sensor 204 detects the input voltage E of the do power supply 199 and outputs an electric signal corresponding to the input voltage E to the gate signal production means 210. The main rector current sensor 206 is connected to the point located downstream in the forward current direction with respect to a joining point of the first terminal of the main reactor L1 to the cathode of the second auxiliary diode D2 or to the point located upstream in regard to current in the forward direction with respect to a branching point of the second terminal of the main reactor L1 from the anode of the first auxiliary diode D1, and detects main reactor current iL1 flowing through the main reactor L1 and outputs an electric signal corresponding to the current iL1 to the gate signal production means 210. The output voltage sensor 208 detects an output voltage Vout across the load 212 and outputs an electric signal corresponding to the output voltage Vout to the gate signal production means 210.

In the following, operation of the SAZZ voltage step-down circuit is described. The SAZZ voltage step-down circuit repeats a MODE 1 to a MODE 6 described below. FIG. 19 illustrates operation of the MODE 1 to the MODE 6.

The MODE 1 is a state wherein the auxiliary switching device S2 is turned on in a state wherein the auxiliary capacitor C1 is charged to eliminate the accumulated charge of the return diode D3. As seen from (1), current for eliminating the accumulated charge of the return diode D3 flows along a route of the auxiliary reactor L2→first auxiliary diode D1→auxiliary switching device S2→second auxiliary diode D2→return diode D3→negative electrode side of the dc power supply 99. Here, the current indicated by (1) turns on the switching device S2 by ZCS (zero current switching) because of the presence of the auxiliary reactor L2. On the other hand, current in the forward direction flows along a route of the return diode D3→main reactor L1→auxiliary reactor L2→load 212 as seen from (2). In the MODE 1, the main switching device S1 remains in an off state.

The MODE 2 is a state of a resonance mode based on a turning on state of the auxiliary switching device S2 wherein the current flowing through the main reactor L1 and the current flowing through the auxiliary switching device S2 are equal to each other and the current flowing through the return diode D3 is zero. In this state, since the current flowing through the return diode D3 is zero, return current flows along a route of the main reactor L1→first auxiliary diode D1→auxiliary switching device S2→second auxiliary diode D2→main reactor L1 as indicated by (4). Consequently, the bias to the first terminal of the auxiliary reactor L2 from the return diode D3 is canceled, and an LC partial resonance circuit is formed by a route of the auxiliary reactor L2→first auxiliary diode D1→auxiliary switching device S2→auxiliary capacitor C1→do power supply 199 as indicated by (3). Consequently, discharging of the auxiliary capacitor C1 begins and the current flowing through the auxiliary reactor L2 LC resonates. Thereafter, the energy of the auxiliary capacitor C1 moves to the auxiliary reactor L2. Then, the discharging of the auxiliary capacitor C1 comes to an end and the charge in the auxiliary capacitor C1 disappears, and consequently, the voltage of the auxiliary capacitor C1 becomes zero.

The MODE 3 is a state wherein the voltage of the auxiliary capacitor C1 is zero and turning on of the main switching device S1 causes ZVZCT operation. In this state, the diode D4 turns on, and consequently, energy stored in the auxiliary reactor L2 begins to flow as inverse current along a route of the auxiliary reactor L2→first auxiliary diode D1→auxiliary switching device S2→second auxiliary diode D2→diode D4→dc power supply 199 as seen from (5). At this time, the main switching device S1 turns on. Consequently, since the diode D4 exhibits an on state and inverse current flows through the diode D4, the current to flow through the main switching device S1 is suppressed, and ZCS (zero current switching) occurs. In short, the main switching device S1 turns on by ZVZCT operation. Meanwhile, as seen from (6), the current flowing along the return diode D3→main reactor L1→auxiliary reactor L2 joins with the current indicated by (5).

The MODE 4 is a state wherein the main switching device S1 is on. In this state, current flows along a route of the dc power supply 199→main switching device S1→main reactor L1→auxiliary reactor L2 as indicated by (7).

The MODE 5 is a state wherein the main switching device S1 and the auxiliary switching device S2 are in an on state. In this state, the auxiliary switching device S2 is in an off state, and since the discharging of the auxiliary capacitor C1 ends already, no current flows through the auxiliary switching device S2. Therefore, the auxiliary switching device S2 turns off by ZCS operation. Further, current flows along a route of the auxiliary capacitor C1→second auxiliary diode D2→main reactor L1→auxiliary reactor L2 as indicated by (8) to charge the auxiliary capacitor C1. Since the auxiliary capacitor C1 is charged up, the turning off of the main switching device S1 is carried out by ZVT operation.

The MODE 6 is a state wherein the main switching device S1 is in an off state. When the charging of the auxiliary capacitor C1 ends, the current indicated by (8) stops, and the return diode D3 is turned on. Consequently, current flows to the load 212 side along a route of the return diode D3→main reactor L1→auxiliary reactor L2 as indicated by (9).

Although the MODE 1 to the MODE 6 described above are repeated, also the SAZZ voltage step-down circuit operates similarly as in the operation of the SAZZ voltage step-up circuit as described above, and particularly the MODE 1 and the MODE 2 can be handled similarly to those of the SAZZ voltage step-up circuit described above. It is to be noted that the reason why the MODE 1 and the MODE 2 do not overlap with each other is that the potential at the second terminal of the auxiliary capacitor C1 is equal to the output voltage Vout and, after the recovery current elimination period Tsw1 elapses, the bias to the first terminal of the auxiliary reactor L2 from the return diode D3 is canceled.

The gate signal production means 210 produces gate signals for turning on/off the main switching device S1 and the auxiliary switching device S2. In particular, the gate signal production means 210 outputs gate signals to the main switching device S1 and the auxiliary switching device S2 such that the auxiliary switching device S2 is turned on prior by the variable delay time Td(t) to turning on of the main switching device S1 similarly as in the first embodiment and the main switching device S1 exhibits an on state for a period of time equal to the pulse width defined by the duty ratio according to the input voltage E and the output voltage Vout.

Figure 20:
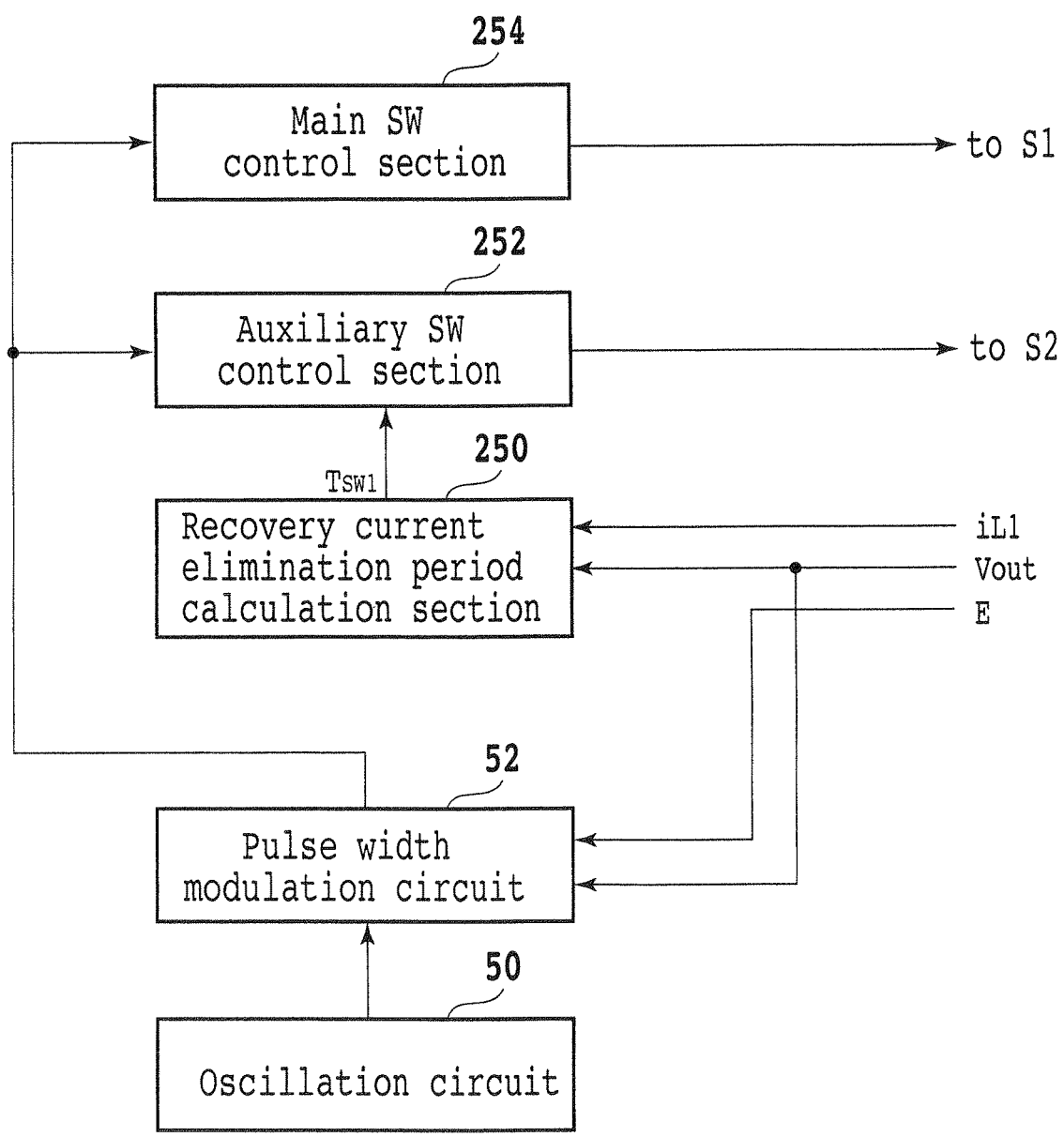
FIG. 20 is a functional block diagram of a gate signal production means shown in FIG. 18.

FIG. 20 is a functional block diagram of the gate signal production means 210, and in FIG. 20, substantially like elements to those in FIG. 2 are denoted by like reference characters. Referring to FIG. 20, the gate signal production means 210 includes an oscillation circuit 50, a pulse width modulation circuit 52, a recovery current elimination period calculation section 250, an auxiliary SW control section 252 and a main SW control section 254. The recovery current elimination period calculation section 250 calculates the recovery current elimination period Tsw1, which is an interval of time until the charge accumulated in the return diode D3 is discharged through the recovery current elimination circuit. While the recovery current elimination period Tsw1 can be calculated similarly as in the first embodiment, since the voltage applied across the auxiliary reactor L2 is the output voltage Vout, the recovery current elimination period Tsw1 is calculated in accordance with the following expression (10):

$$Tsw1 = L2 \times iL1(t)/Vout \qquad (10)$$

where L2 is the inductance of the auxiliary reactor L2, and iL1(t) the current flowing through the main reactor L1 at time t at present.

The auxiliary SW control section 252 turns on the auxiliary switching device S2 if the time t at present is prior by the variable delay time Td(t) provided by the following expression (11) to the time at which the auxiliary switching device S2 is to be turned on.

$$Td(t) = L2 \times iL1(t)/Vout + \pi(L2C1)^{1/2} \qquad (11)$$

where C1 is the capacitance of the auxiliary capacitor C1.

$\pi(L2C1)^{1/2}$ of the second term is the time or partial resonance period in which the charge of the auxiliary capacitor C1 disappears or is minimized by discharging similarly as in the first embodiment.

The main SW control section 254 controls on/off of the main switching device S1 so that the main switching device S1 exhibits an on state within a width equal to the pulse width indicated by the pulse width modulation signal outputted from the pulse width modulation circuit 52.

Figure 21:
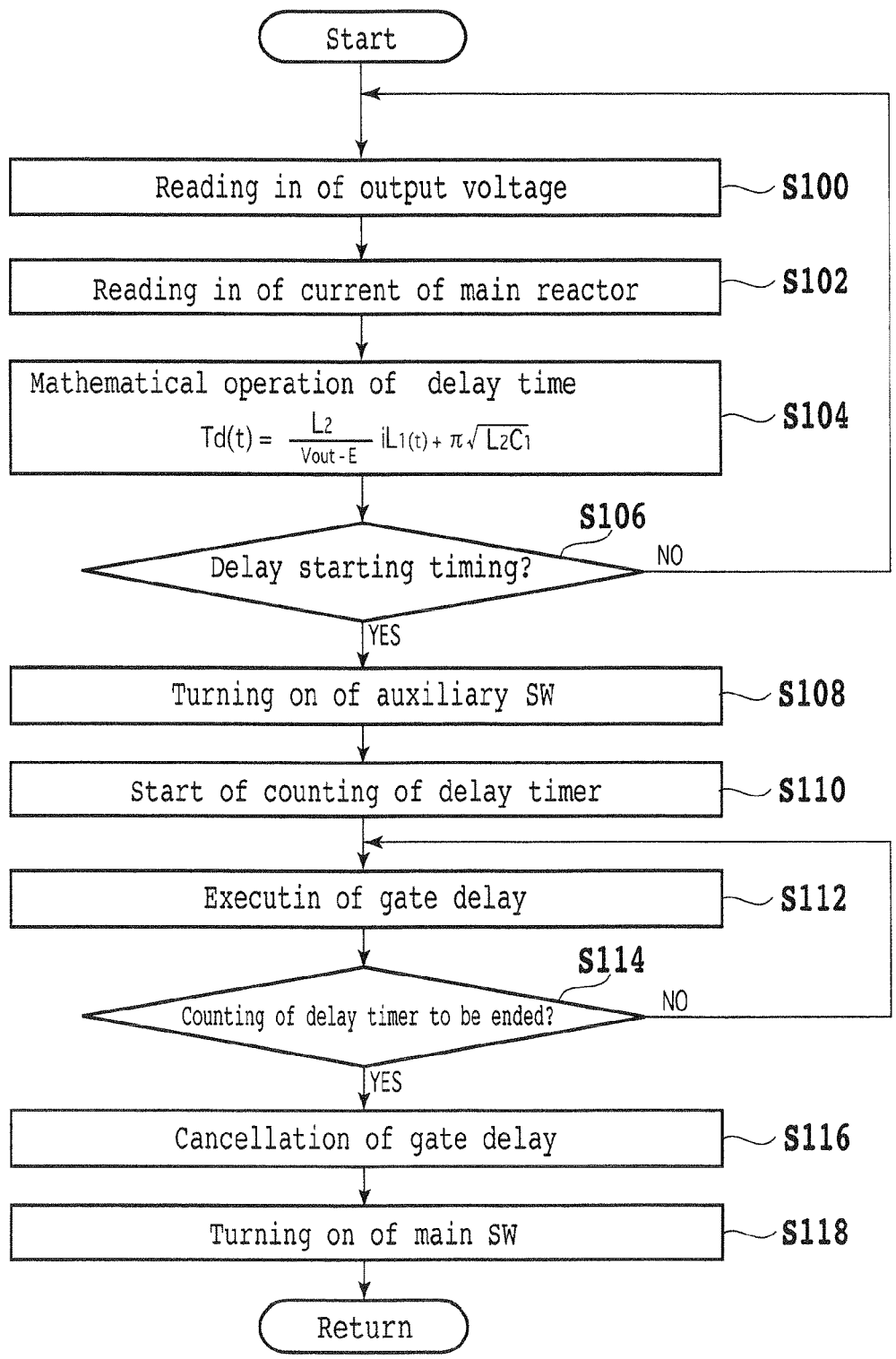
FIG. 21 is a flow chart illustrating control of an auxiliary switching device according to the third embodiment of the present invention.

FIG. 21 is a flow chart illustrating operation of the auxiliary SW control section 252 and the main SW control section 254. At step S100, the output voltage Vout is read in. At step S102, the main reactor current iL1(t) is read in. At step S104, the variable delay time Td(t) indicated by the expression (11) is calculated. At step S106, it is decided whether or not the time t at present is prior by the variable delay time Td(t) to the time, at which the main switching device S1 is to be turned on, indicated by the pulse width modulation signal outputted from the pulse width modulation circuit 52. If the decision is affirmative, then it is decided that the time t at present is the delay starting timing, and the processing advances to step S58. On the other hand, if the decision is negative, then the processing returns to step S100. At steps S108 to S118, processes similar to those at steps S12 to S22 described hereinabove with reference to FIG. 6 are executed.

From the foregoing, also in the case of the SAZZ voltage step-down circuit, soft switching can be carried out similarly as in the SAZZ voltage step-up circuit, and the switching loss and the resistance loss can be reduced and the efficiency is improved when compared with those of the conventional art wherein the auxiliary switching device S2 is turned on prior by a fixed delay period to the main switching device S1.

The present invention is not limited to the embodiments described above but can be applied also to other resonance type electric power conversion apparatus.

Figure 22:
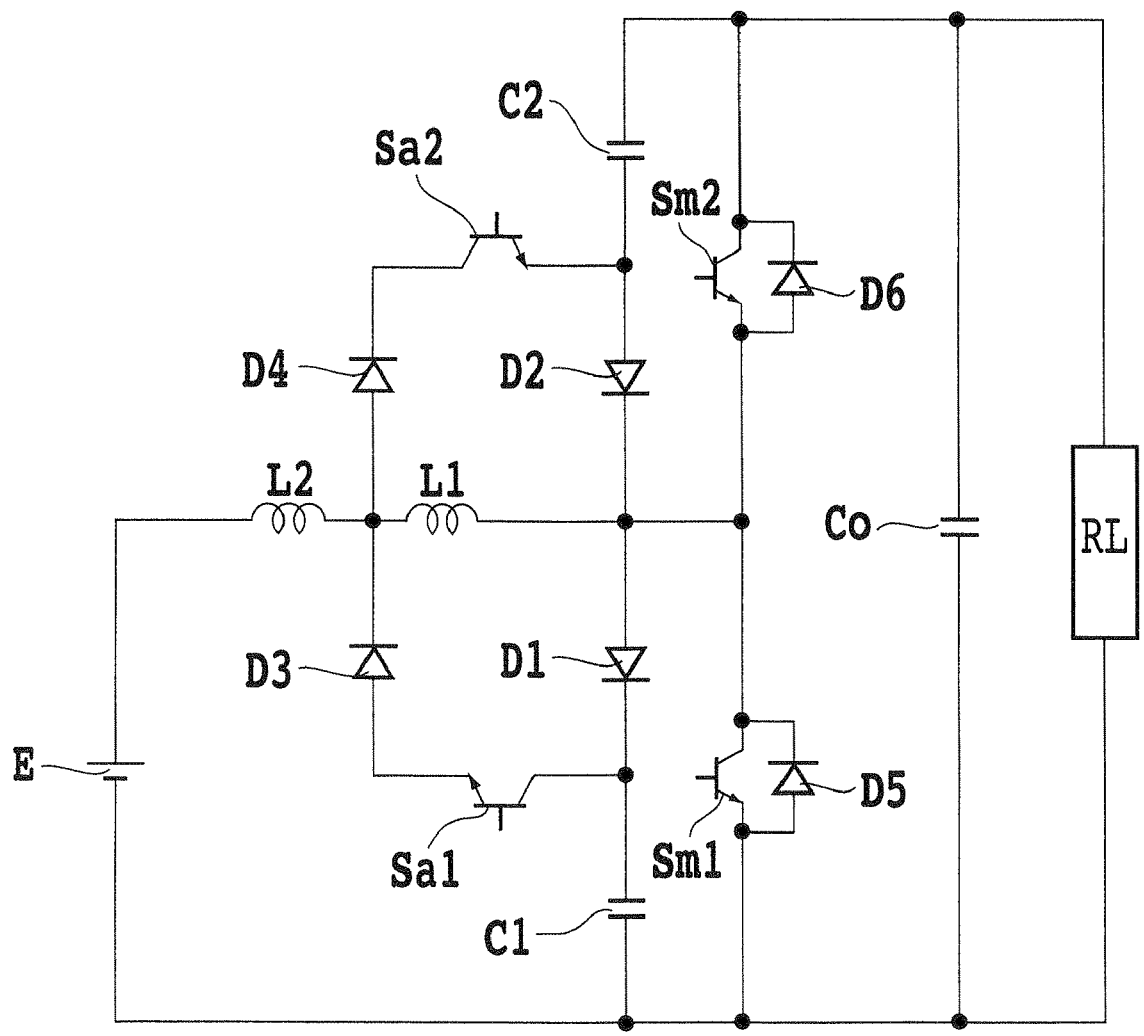
FIG. 22 is a circuit diagram showing a SAZZ bidirectional voltage step-up circuit.

For example, in the case of a SAZZ bidirectional voltage step-up circuit shown in FIG. 22, upon voltage boost operation from an input voltage E to a load RL, elements Sm1, Sa1, C1, L1, L2, D6, D1 and D3 correspond to the elements S1, S2, C1, L1, L2, D3, D1 and D2 shown in FIG. 1, respectively. In the MODE 1, a recovery current elimination circuit is formed from the elements D1, Sa1, D3 and L2, and current for eliminating accumulated charge of the diode D6 flows along a route of D6→D1→Sa1→D3→L2. In the MODE 2, a partial resonance circuit is formed from the elements C1, Sa1, D3, L2 and E, and charge in the auxiliary capacitor C1 is discharged along a path of C1→Sa1→D3→L2.

On the other hand, upon voltage step-down operation from the load RL to the input voltage E, elements Sm2, Sa2, C2, L1, L2, D5, Vout and E correspond to S1, S2, C1, L1, L2, D3, E and Vout shown in FIG. 18, respectively. In the MODE 1, a recovery current elimination circuit is formed from the elements L2, D4, Sa2 and D2, and current for eliminating the accumulated charge in the diode D5 flows along a route of E→L2→D4→Sa2→D2→D5. Since, in the MODE 1, the input voltage E is applied across the auxiliary reactor L2, E is substituted into Vout in the expression (11) given hereinabove. In the MODE 2, a resonance circuit is formed from the elements L2, D4, Sa2, C2, RL and E, and charge in the auxiliary capacitor C1 is discharged along a route of L2→D4→Sa2→C2.

From the foregoing, the present invention can be applied also to the SAZZ bidirectional voltage step-up circuit.

Figure 23:
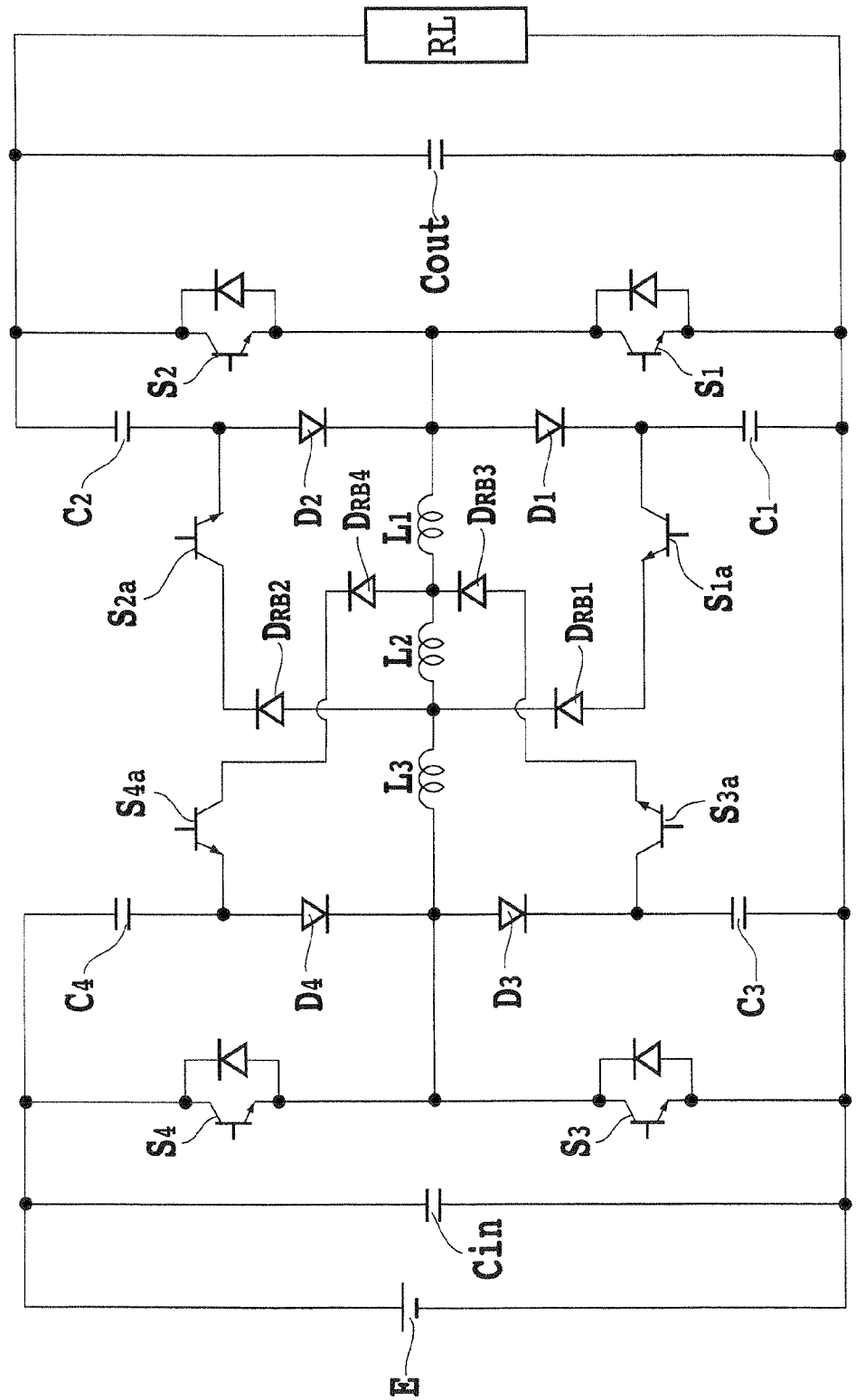
FIG. 23 is a circuit diagram showing a bidirectional SAZZ voltage step-up/step-down circuit.

It is apparent from the foregoing description of the SAZZ voltage step-up circuit and the SAZZ voltage step-down circuit that the present invention can be applied also to a SAZZ bidirectional voltage step-up/step-down circuit shown in FIG. 23. It is to be noted that, in the SAZZ bidirectional voltage step-up/step-down circuit, reference character L2 denotes a main reactor, and reference characters L1 and L3 denote each an auxiliary reactor. Only one main reactor current sensor is provided on downstream with regard to current in the forward direction with respect to a joining point of the first terminal of the main reactor L2 to the cathode of an auxiliary diode DRB1 or a branching point of the first terminal of the main reactor L2 from the anode of an auxiliary diode DRB2 or on upstream with regard to current in the forward direction with respect to a joining point of the main reactor L2 to the cathode of an auxiliary diode DRB3 or a branching point of the anode of an auxiliary diode DRB4 from the main reactor L2. The only one main reactor current sensor can be used commonly among forward direction voltage step-up operation, forward direction voltage step-down operation, reverse direction voltage step-up operation and reverse direction voltage step-down operation.

Further, if a voltage step-up circuit is formed as a resonance type electric power conversion apparatus including a main circuit including a main reactor connected at a first terminal thereof to the positive electrode side of a dc power supply and at a second terminal thereof to the load side, a main switching device interposed between a second terminal of the main reactor and the negative electrode of the dc power supply, an inverse-parallel diode connected in inverse-parallel to the main switching device, and an output power diode interposed between the second terminal of the main reactor and the load, an auxiliary circuit including an auxiliary reactor, an auxiliary switch, and an auxiliary capacitor connected in parallel to the main switching device, the auxiliary circuit being provided for forming a recovery current elimination circuit for discharging charge accumulated in the output power diode in a direction reverse to that of current which flows from the main reactor to the auxiliary reactor and a partial resonance circuit for discharging charge accumulated in the auxiliary capacitor to turn on the inverse-parallel diode, then the main switching device can be turned on at time at which the inverse-parallel diode is turned on based on a recovery current elimination period and time at which the charge of the auxiliary capacitor disappears or is minimized similarly as described above.

Meanwhile, if a voltage step-down circuit is formed as a resonance type electric power conversion apparatus including a main circuit including a main reactor connected at a first terminal thereof to the positive electrode side of a do power supply and at a second terminal thereof to the load side, a main switching device interposed between the de power supply and the main reactor, an inverse-parallel diode connected in inverse-parallel to the main switching device, and a return diode interposed between the second terminal of the main reactor and the negative terminal of the do power supply, an auxiliary circuit including an auxiliary reactor, an auxiliary switch, and an auxiliary capacitor connected in parallel to the main switching device, the auxiliary circuit being provided for forming a recovery current elimination circuit for discharging charge accumulated in the return diode in a direction reverse to that of current which flows from the main reactor to the auxiliary reactor and a partial resonance circuit for discharging charge accumulated in the auxiliary capacitor to turn on the inverse-parallel diode, then the main switching device can be turned on at time at which the inverse-parallel diode is turned on based on a recovery current elimination period and time at which the charge of the auxiliary capacitor disappears or is minimized similarly as described above.

The present invention is not limited to the details of the above described preferred embodiments. The scope of the invention is defined by the appended claims and all changes and modifications as fall within the equivalence of the scope of the claims are therefore to be embraced by the invention.

What is claimed is:

1. A resonance type electric power conversion apparatus comprising:

a main circuit including a main reactor connected at a first terminal thereof to the positive electrode side of a dc power supply and at a second terminal thereof to the load side, a main switching device interposed between a second terminal of said main reactor and the negative electrode of said dc power supply, an inverse-parallel diode connected in inverse-parallel to said main switching device, and an output power diode interposed between the second terminal of said main reactor and the load;

an auxiliary circuit including an auxiliary reactor, an auxiliary switch, and an auxiliary capacitor connected in parallel to said main switching device, said auxiliary circuit being provided for forming a recovery current elimination circuit for discharging charge accumulated in said output power diode in a direction reverse to that of current which flows from said main reactor to said auxiliary reactor and a partial resonance circuit for discharging charge accumulated in said auxiliary capacitor to turn on said inverse-parallel diode;

recovery current elimination period calculation means for calculating a recovery current elimination period after the present point of time until the current flowing through said output power diode becomes zero and the charge of said output power diode disappears based on a voltage value across said auxiliary reactor, a current value of said main reactor and an inductance value of said auxiliary reactor; and control means for calculating delay time until the accumulated charge in said auxiliary capacitor is minimized based on the recovery current elimination period and controlling said auxiliary switching device to turn on prior by the delay time to said main switching device, wherein:

said auxiliary reactor is connected at a first terminal thereof to the positive terminal of said dc power supply and at a second terminal thereof to a first terminal of said main reactor;

said main reactor is connected at a first terminal thereof to the positive electrode of said dc power supply through the second terminal of said auxiliary reactor and at a second terminal thereof to the anode of said output power diode;

said auxiliary capacitor is interposed between the negative electrode of said dc power supply and said auxiliary switching device;

said recovery current elimination circuit outputs charge accumulated in said output power diode to said dc power supply through said auxiliary switching device and said auxiliary reactor;

said partial resonance circuit is formed from said auxiliary capacitor, auxiliary reactor and dc power supply and outputs the charge accumulated in said auxiliary capacitor to said dc power supply;

said recovery current elimination period calculation means determines a value obtained by dividing the product of the inductance of said auxiliary reactor and a value of current flowing through said main reactor at the present point of time by a differential voltage value of the output voltage value of said output power diode and the voltage value of said dc power supply as the recovery current elimination period; and said control means determines time obtained by adding the recovery current elimination period and a one-half period of time variation of the voltage across said auxiliary capacitor of said partial resonance circuit as the delay time.

2. The resonance type electric power conversion apparatus according to claim 1, wherein said recovery current elimination period calculation means calculates the recovery current elimination period based on either one of the voltage of said dc power supply and an output voltage of said output power diode and a step-up voltage ratio.

3. A resonance type electric power conversion apparatus comprising:

a main circuit including a main reactor connected at a first terminal thereof to the positive electrode side of a dc power supply and at a second terminal thereof to the load side, a main switching device interposed between a second terminal of said main reactor and the negative electrode of said dc power supply, an inverse-parallel diode connected in inverse-parallel to said main switching device, and an output power diode interposed between the second terminal of said main reactor and the load;

an auxiliary circuit including an auxiliary reactor, an auxiliary switch, and an auxiliary capacitor connected in parallel to said main switching device, said auxiliary circuit being provided for forming a recovery current elimination circuit for discharging charge accumulated in said output power diode in a direction reverse to that of current which flows from said main reactor to said auxiliary reactor and a partial resonance circuit for discharging charge accumulated in said auxiliary capacitor to turn on said inverse-parallel diode;

recovery current elimination period calculation means for calculating a recovery current elimination period after the present point of time until the current flowing through said output power diode becomes zero and the charge of said output power diode disappears based on a voltage value across said auxiliary reactor, a current value of said main reactor and an inductance value of said auxiliary reactor; and control means for calculating delay time until the accumulated charge in said auxiliary capacitor is minimized based on the recovery current elimination period and controlling said auxiliary switching device to turn on prior by the delay time to said main switching device, wherein:

said main reactor is connected at a first terminal thereof to the positive electrode of said dc power supply and at a second terminal thereof to the anode of said output power diode;

said auxiliary reactor is connected at a first terminal thereof to a second terminal of said main reactor and at a second terminal thereof to said auxiliary switching device;

said auxiliary switching device is interposed between the second terminal of said auxiliary reactor and the negative electrode of said dc power supply;

said recovery current elimination circuit outputs charge accumulated in said output power diode to said dc power supply through said auxiliary reactor and said auxiliary switching device;

said partial resonance circuit is formed from a loop circuit of said auxiliary capacitor, auxiliary reactor and auxiliary switching device and outputs the charge accumulated in said auxiliary capacitor to said dc power supply;

said recovery current elimination period calculation means determines a value obtained by dividing the product of inductance of said auxiliary reactor and a value of current flowing through said main reactor at the present point of time by a value of an output voltage of said output power diode; and said control means determines time obtained by adding the recovery current elimination period and a one-half period of time variation of a voltage across said auxiliary capacitor of said partial resonance circuit.

4. The resonance type electric power conversion apparatus according to claim 3, wherein said recovery current elimination period calculation means calculates the recovery current elimination period based on either one of the voltage of said dc power supply and an output voltage of said output power diode and a step-up voltage ratio.

* * * * *